United States Patent
Savicki, Jr. et al.

(10) Patent No.: US 8,853,893 B2
(45) Date of Patent: Oct. 7, 2014

(54) ELECTRICAL WIRING DEVICE FOR LIGHTING CONTROL

(75) Inventors: Gerald R. Savicki, Jr., Canastota, NY (US); Kent Morgan, Groton, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 470 days.

(21) Appl. No.: 13/332,948

(22) Filed: Dec. 21, 2011

(65) Prior Publication Data

US 2013/0106287 A1  May 2, 2013

Related U.S. Application Data

(60) Provisional application No. 61/554,725, filed on Nov. 2, 2011.

(51) Int. Cl.
| | | |
|---|---|---|
| H01H 9/54 | (2006.01) | |
| H01H 13/00 | (2006.01) | |
| H01H 23/02 | (2006.01) | |
| H01H 11/00 | (2006.01) | |
| H01H 23/14 | (2006.01) | |
| H05B 33/08 | (2006.01) | |
| H01H 9/52 | (2006.01) | |

(52) U.S. Cl.
CPC ......... *H05B 33/0815* (2013.01); *H01H 23/025* (2013.01); *H01H 11/0018* (2013.01); *Y02B 20/346* (2013.01); *H01H 23/14* (2013.01); *H01H 9/52* (2013.01)
USPC ............................ 307/140; 307/139; 200/339

(58) Field of Classification Search
USPC ......... 307/154, 155, 156, 157, 139, 140, 143; 200/335, 339, 341
See application file for complete search history.

(56) References Cited

U.S. PATENT DOCUMENTS

| | | |
|---|---|---|
| 4,221,941 A | 9/1980 | Genovese |
| 4,737,609 A | 4/1988 | Yuhasz et al. |
| 4,880,950 A | 11/1989 | Carson et al. |
| 4,924,349 A | 5/1990 | Buehler et al. |
| 4,939,383 A | 7/1990 | Tucker et al. |
| RE33,504 E | 12/1990 | Yuhasz et al. |
| 4,988,840 A | 1/1991 | Carson et al. |
| 5,068,639 A | 11/1991 | Swanson et al. |
| D325,567 S | 4/1992 | Jacob, Jr. et al. |
| 6,005,308 A | 12/1999 | Bryde et al. |
| 8,592,681 B2 * | 11/2013 | Alderson et al. ................ 174/66 |
| 2010/0314226 A1 | 12/2010 | Patel et al. |
| 2011/0109297 A1 | 5/2011 | Tosuntikool |
| 2011/0147037 A1 | 6/2011 | Tee et al. |
| 2011/0205135 A1 | 8/2011 | Patel et al. |
| 2011/0259634 A1 | 10/2011 | Alderson et al. |
| 2011/0259635 A1 | 10/2011 | Alderson |
| 2011/0259720 A1 | 10/2011 | Wu et al. |
| 2011/0259721 A1 * | 10/2011 | Hoffman et al. ............. 200/339 |
| 2011/0259722 A1 | 10/2011 | Alderson et al. |
| 2011/0261511 A1 | 10/2011 | Alderson et al. |

* cited by examiner

*Primary Examiner* — Minh D A
(74) *Attorney, Agent, or Firm* — Daniel P. Malley; Bond Schoeneck & King, PLLC

(57) ABSTRACT

The present invention is directed to a power control device. The device includes an interchangeable user interface assembly includes a frame member having a plurality of connector elements configured to mate with a plurality of frame connection apertures. The frame member is removable from the device heat sink without any tools. The interchangeable user interface assembly includes an interface paddle rotatably coupled to the frame member and detached relative to the device's rocker switch such that the interface paddle slidably moves relative to the rocker switch with at least one degree of freedom during a rotational movement, the user interface assembly further including an interface dimmer movably disposed within the frame member and coupled to the device's dimmer actuator.

40 Claims, 23 Drawing Sheets

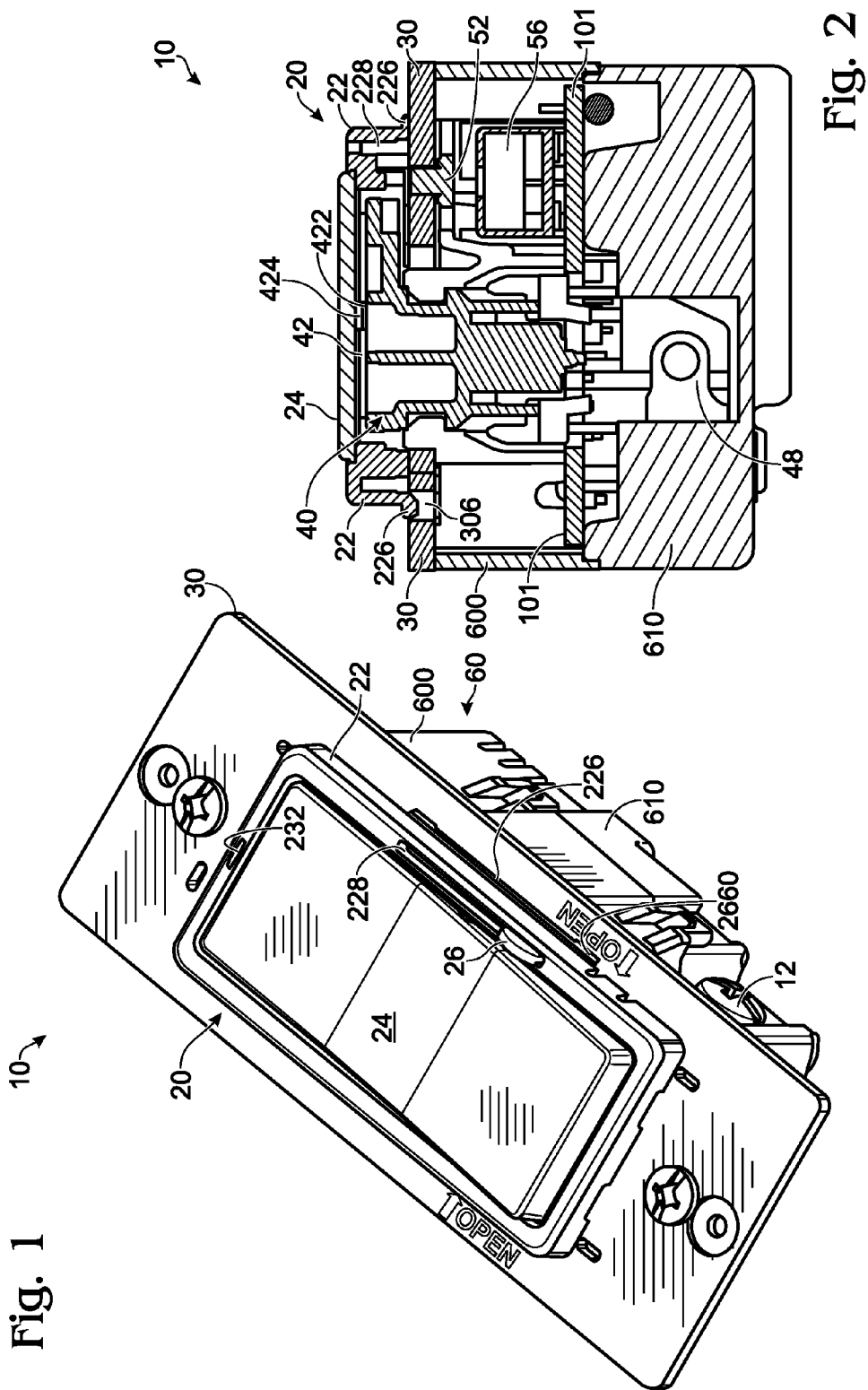

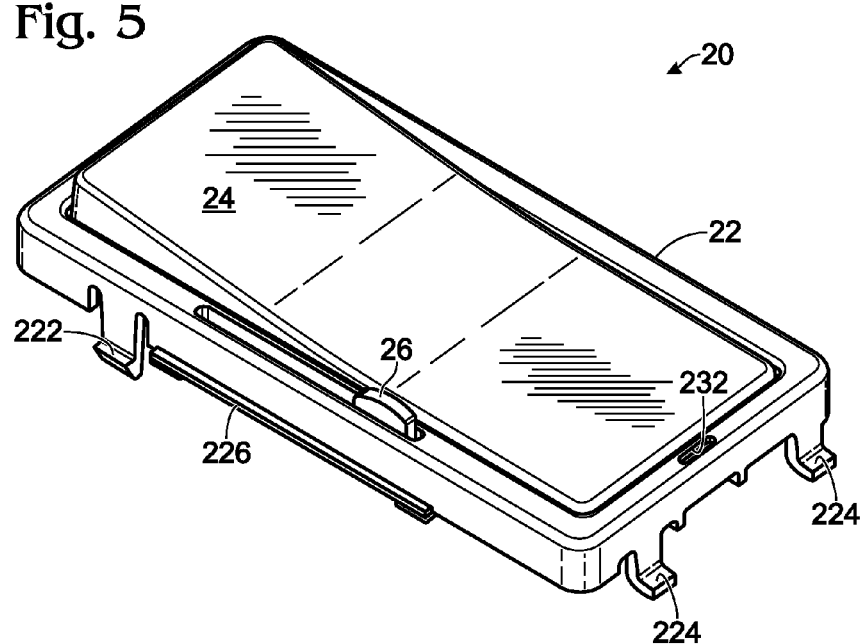
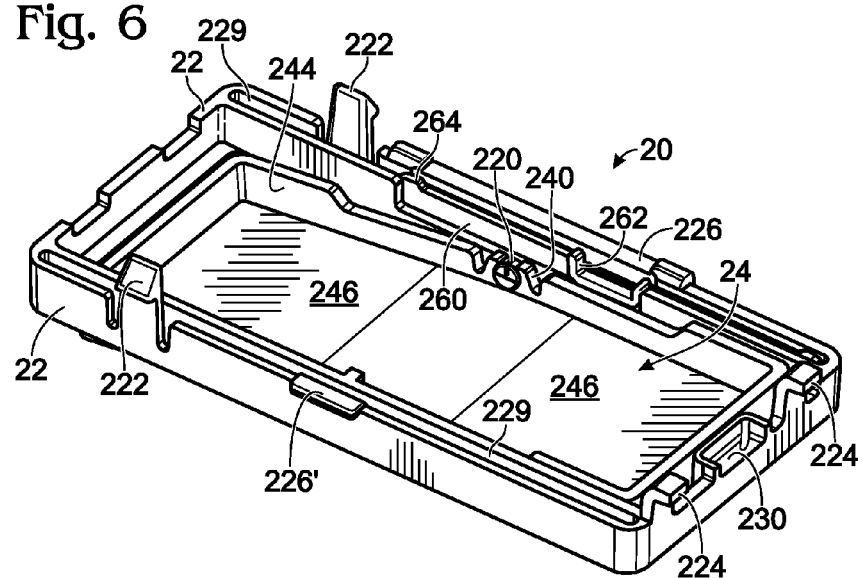

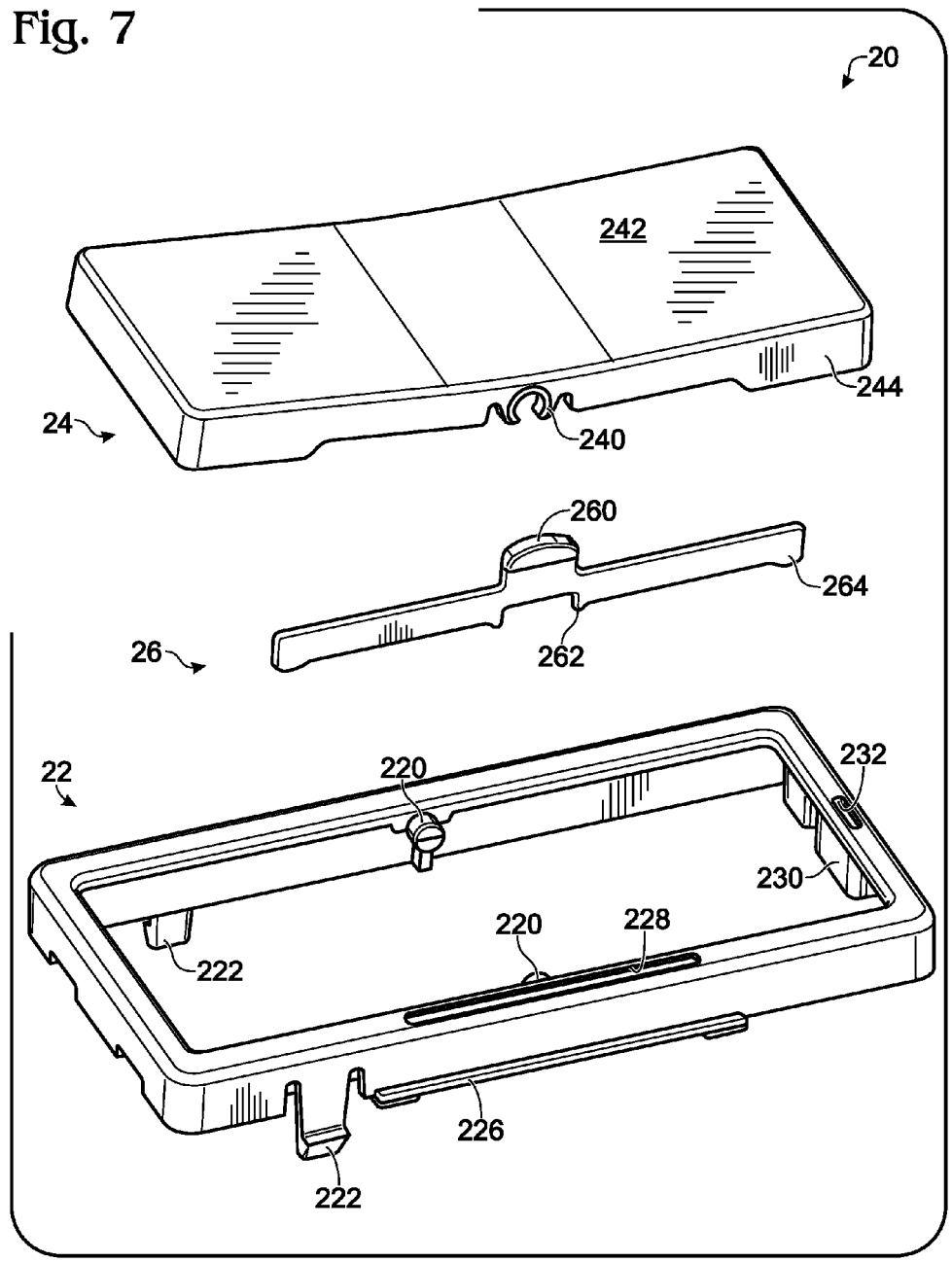

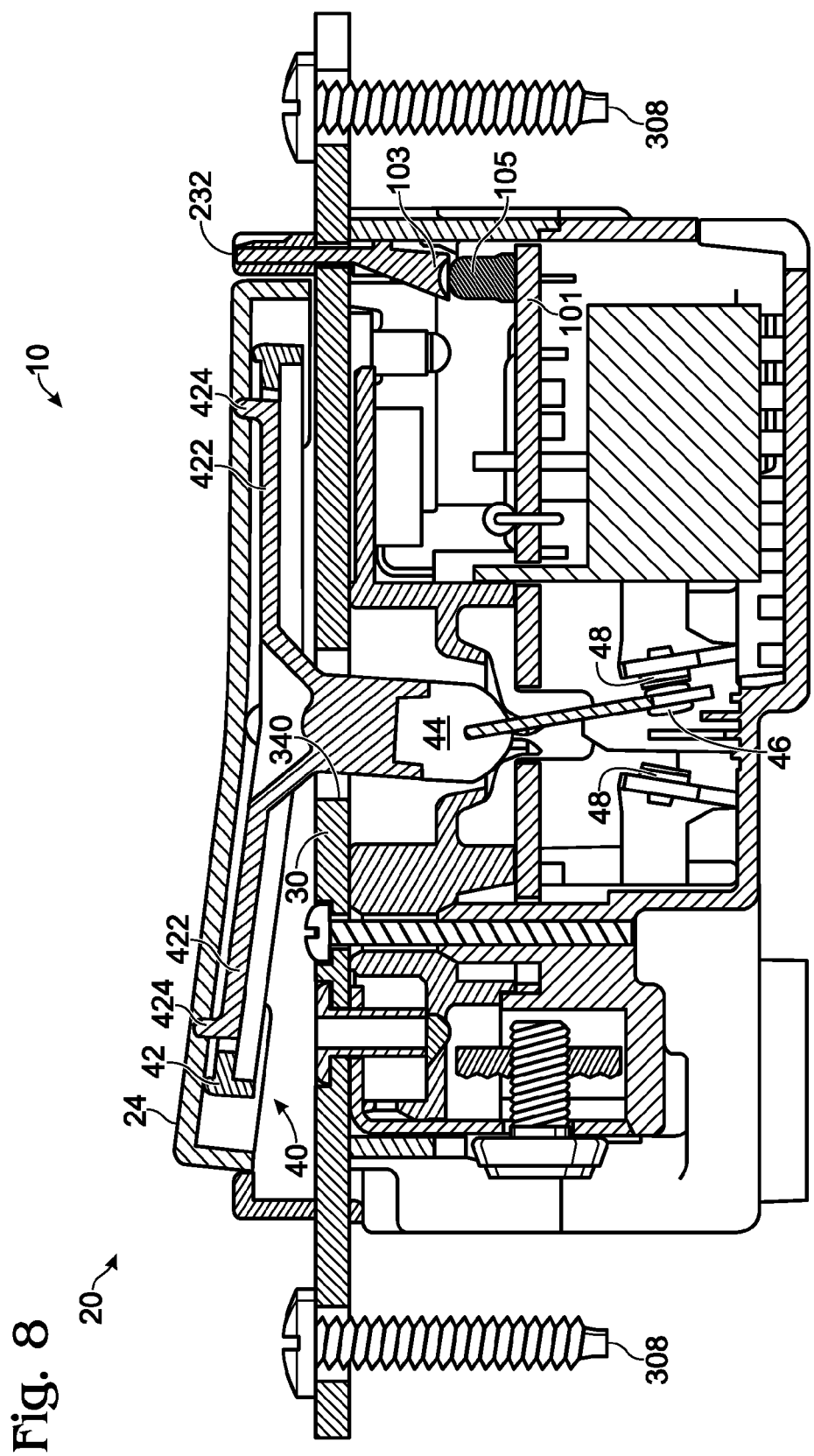

ELECTRICAL WIRING DEVICE FOR LIGHTING CONTROL

RELATED APPLICATIONS

This application claims priority under 35 U.S.C. 119(e) to U.S. Provisional Patent Application 61/554,725, filed on Nov. 2, 2011, which is incorporated herein by reference in its entirety.

BACKGROUND OF THE INVENTION

1. Field of the Invention

The present invention relates generally to electrical wiring devices, and particularly to electrical wiring devices for lighting control.

2. Technical Background

The most basic kind of power control device provides an ON/OFF control for electrical lamps, fans, or other such devices. For example, a device of this type may include a two-position wall switch that is toggled between the ON position and the OFF position. A power control device may also be equipped with a dimmer or a speed control circuit that allows the user to adjust the amount of power delivered to the load to a desired level. These types of power control devices allow a user to adjust the amount of current delivered to an electrical load, such as a light or a motor. When the electric load is a lighting device, the power control device is commonly referred to as a dimmer. If the power control device is configured to control a motor, such as a fan motor, the power control device is referred to as a motor speed controller. Motor speed controllers are also used to control the speed of machinery such as power tools, electric drills, chair lifts, stationary machinery, and other such variable speed motor driven elements. Moreover, some power control devices provide a continuous adjustment whereas others provide discrete adjustment levels.

The dimming or fan speed control functionality may be implemented using a voltage divider in combination with a potentiometer. Power levels may be controlled by adjusting the resistance of the potentiometer to thereby adjust the voltage output of the voltage divider. The voltage divider is typically coupled to a solid state switch such as a thyristor, FET switch, a silicon-controlled rectifier, etc. Specifically, the voltage divider output determines when the solid state switch is ON or OFF during the AC line cycle. The duration of the ON time relative to the entire AC line cycle is sometimes referred to as the duty cycle; and the duty cycle ultimately determines the ambient light level or motor speed.

Power control devices are typically packaged in a wiring device form factor for installation in an outlet box. The exterior of the wiring device includes either screw terminals or wire terminals for subsequent connection between the AC power source and the load. The device is installed by connecting the wiring inside an outlet box to the appropriate screw terminals disposed on the exterior of the wiring device. The power control wiring device is then inserted into the outlet box and attached to the outlet box using one or more fasteners. A cover plate is installed to complete the installation. Thus, installation of a power control device is a somewhat involved procedure that typically requires the services of an electrician.

A consumer may buy a power control device for a variety of reasons. The consumer may require a device that can control a unit that includes a fan motor and lighting element. Alternatively, the consumer may require a three-way switch or a switch that includes dimming functionality. In addition to the aforementioned functionality, the consumer will also select a power control device with aesthetics in mind What is needed, therefore, is a power control device that may be used with a set of homologous user-actuation interface assemblies such that a user-actuation interface may be safely removed and replaced with another user-actuation interface assembly without having to remove the device from the outlet box and without the need for tools.

SUMMARY OF THE INVENTION

The present invention addresses this need by providing a power control device that may used with a set of homologous user-actuation interface assemblies such that a user-actuation interface may be safely removed and replaced with another user-actuation interface assembly without having to remove the device from the outlet box and without the need for tools. Each user-actuation interface in the set of user-actuation interfaces is functionally identical or equivalent to the other user-actuation interfaces in the set, yet aesthetically different.

One aspect of the present invention is directed to a power control device for use in an electrical distribution system that includes at least one electrical load. The device includes a housing assembly having a plurality of terminals configured to couple the device to the electrical distribution system and a circuit assembly coupled to the plurality of terminals. The circuit assembly includes a set of electrical contacts movable between a first position and a second position. The circuit assembly further includes a power regulation circuit coupled to the set of electrical contacts, the power regulation circuit being configured to control an amount of power provided to the at least one electrical load. A heat sink is coupled to the housing assembly, the heat sink having a major surface configured to dissipate thermal energy generated by the circuit assembly, the major surface including a plurality of frame connection apertures. A rocker switch mechanism is coupled to a switch actuator member configured to actuate the set of electrical contacts between the first position and the second position. The switch actuator member has a first axis of rotation in or below a plane formed by the major surface. A dimmer actuator is configured to adjust the power regulation circuit. An interchangeable user interface assembly includes a frame member having a plurality of connector elements configured to mate with the plurality of frame connection apertures. The frame member is removable from the heat sink without any tools. The interchangeable user interface assembly includes an interface paddle rotatably coupled to the frame member and detached relative to the rocker switch such that the interface paddle slidably moves relative to the rocker switch with at least one degree of freedom during a rotational movement, the user interface assembly further including an interface dimmer movably disposed within the frame member and coupled to the dimmer actuator.

In another aspect, the present invention is directed to a power control device for use in an electrical distribution system that includes at least one electrical load. The device includes a housing assembly having a plurality of terminals configured to couple the device to the electrical distribution system and a circuit assembly coupled to the plurality of terminals. The circuit assembly includes a set of electrical contacts movable between a first position and a second position. The circuit assembly further includes a power regulation circuit coupled to the set of electrical contacts, the power regulation circuit being configured to control an amount of power provided to the at least one electrical load. A heat sink is coupled to the housing assembly, the heat sink having a major surface configured to dissipate thermal energy generated by the circuit assembly, the major surface including a plurality of frame connection apertures. A rocker switch mechanism is coupled to a switch actuator member configured to actuate the set of electrical contacts between the first position and the second position. The switch actuator member has a first axis of rotation in or below a plane formed by the major surface. A dimmer actuator is configured to adjust the power regulation circuit. An interchangeable user interface assembly includes a frame member having a plurality of connector elements configured to mate with the plurality of frame connection apertures. The frame member is removable from the heat sink without any tools. The interchangeable user interface assembly includes an interface paddle rotatably coupled to the frame member with a second axis of rotation offset from the first axis of rotation such that the interface paddle is disposed over the rocker switch but detached therefrom. The user interface assembly further includes an interface dimmer movably disposed within the frame member and coupled to the dimmer actuator via the dimmer registration feature.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 1 is a perspective view of a power control device in accordance with a first embodiment of the present invention;

FIG. 2 is a latitudinal cross-sectional view of the device depicted in FIG. 1;

FIG. 5 is a topside detail view of a user-actuation interface assembly depicted in FIG. 1;

FIG. 6 is a detail view of the underside of the user-actuation interface assembly depicted in FIG. 5;

FIG. 7 is an exploded view of the user-actuation interface assembly depicted in FIG. 5;

FIG. 8 is a longitudinal cross-sectional view of the device depicted in FIG. 1;

DETAILED DESCRIPTION

Figure 3:
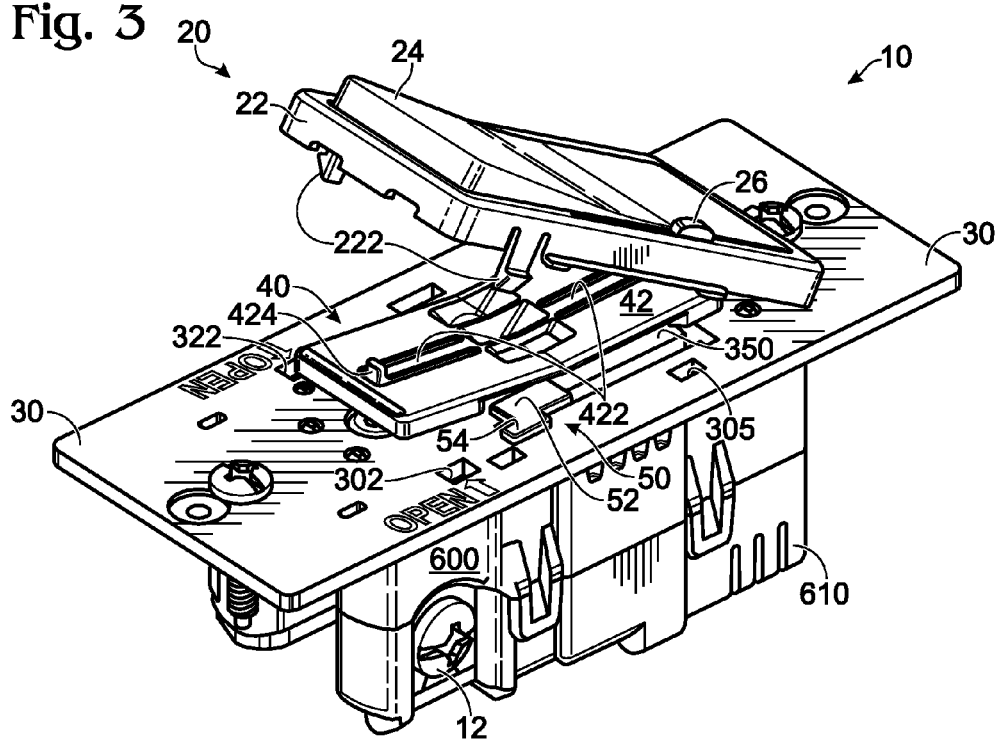
FIG. 3 is a perspective view of the device depicted in FIG. 1 with the user-actuation interface partially removed.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the power control electrical wiring device of the present invention is shown in FIG. 1, and is designated generally throughout by reference numeral 10.

The reference numerals of the various component parts of the present invention as depicted herein are shown in Table I provided below.

TABLE I

Reference Numerals in Drawing Figures.

| | | | |
|---|---|---|---|
| 10. | | | Power control electrical wiring device. |
| | 12. | | Screw terminals. |
| 20; 20-1; 20-2. | | | Removable user-actuation interface assembly. (Alternate embodiments of the assembly) |
| | 22. | | User-actuation interface frame. |
| | | 220. | Trunions. |
| | | 221. | Trunion sleeve (Alternate embodiment). |
| | | 222. | Flexible retainer clip. |
| | | 224. | Stationary anchors. |
| | | 225, 225' | Frame Windows. |
| | | 2250 | Window retainer elements. |
| | | 226, (226'). | Retainer flange. |
| | | 228. | Elongated slide slot. |
| | | 229. | Slide pocket. |
| | | 230. | Light pipe compartment. |
| | | 232. | Light aperture. |
| | | 233. | Interior slot for deco-slide (Alternate embodiment). |
| | 24, (24') | | User-actuation rocker paddle. |
| | | 240. | Trunion sleeve. |
| | | 241. | Paddle Trunion (Alternate embodiment). |
| | | 242. | User-actuation interface paddle major surface. |
| | | 244. | User-actuation interface paddle side wall. |
| | | 246. | User-actuation interface paddle interior surface. |
| | 26, 26', (26-1, 26-2) | | User-interface slider mechanism. (Alternate embodiments) |
| | | 260 | User-interface slide body. |
| | | 261 | Slide connection point (Alternate embodiment). |
| | | 262 | User-actuation interface slide |
| | | 262-1 | registration feature. (Self-aligning opening in alternate embodiment). |
| | | 263 | Slide plate (Alternative embodiment). |
| | | 2630 | Snap-in elements |
| | | 264 | Snap-in elongated user-actuation interface slide body member. |
| | | 266 | Barreled cover member (Alternate embodiment). |
| 30. | | | Metal mounting plate (Heat sink). |
| | | 300 | Plate major surface. |
| | | 302 | Flex clip apertures. |
| | | 304 | Anchor apertures. |
| | | 305 | Retainer apertures. |
| | | 306 | Mounting apertures. |
| | | 308 | Mounting screws. |
| | | 310 | Light pipe aperture. |
| | | 340 | Functional switch opening. |
| | | 350 | Slide dimmer opening. |
| | | 360 | Back body mounting apertures. |
| 40. | | | Functional switch assembly. |
| | 42. | | Functional rocker switch |
| | | 420 | Rocker switch major surface. |
| | | 422 | Integral leaf spring. |
| | | 424 | Rocker switch contact point. |
| | 44. | | Pendulum switch actuator. |
| | | 440. | Actuator Trunion. |
| | 46. | | Movable switch contact. |
| | 48. | | Stationary contact. |
| 50. | | | Functional Dimmer assembly. |
| | 52. | | Functional dimmer actuator. |
| | 54. | | Functional dimmer registration feature. |
| | 56. | | Potentiometer. |
| 60. | | | Device Housing assembly. |
| | 600. | | Separator member. |
| | 610. | | Back Body member. |
| 100. | | | Electrical circuit assembly. |
| | 101. | | Printed Circuit Board (PCB). |
| | 102 | | Power Supply circuit |
| | 103. | | Light pipe. |
| | 104 | | High frequency noise suppression filter |
| | 105. | | Light emitting diode (LED). |
| | 106 | | Voltage Regulator Circuit. |

TABLE I-continued

Reference Numerals in Drawing Figures.

| | | |
|---|---|---|
| | 108 | Power regulation Circuit. |
| | 108-1 | Power-up regulation portion 108-1. |
| | 108-2 | Resistive regulation portion. |
| 150 | | Mounting terminals/Connections |
| 152 | | Traveler conductors |
| 154 | | Common conductors |

As embodied herein and depicted in FIG. 1, a perspective view of a power control device 10 in accordance with a first embodiment of the present invention is disclosed. The power control device 10 includes a removable user-actuation interface assembly 20 that is connected to the heat sink 30. The user-actuation interface 20 may be removed from heat sink 30 without the use of any tools. Once the user-actuation interface 20 is connected to the heat sink 30, a standard NEMA-26 wall cover plate is attached to complete the assembly. Of course, interface 20 is sized to fit inside the aperture of the wall plate.

The heat sink 30 also functions as a metal mounting plate. The heat sink is configured to dissipate 5-10 W of thermal energy (heat) that is generated by the electrical and electronic components disposed within the device housing assembly 60. The user-actuation assembly 20 is configured to mate with the heat sink 30 such that the heat dissipation characteristics of the heat sink 30 are not significantly impacted. This is accomplished in several ways. The user-actuation assembly 20 conforms to a standard wall cover plate such that a large surface area of the heat sink 30 uncovered. Moreover, the gaps disposed along the bottom portion of the frame 22 function as vents that allow the heat to dissipate.

The user-actuation assembly 20 includes an interface frame 22 that is snapped into mating apertures formed in the heat sink 30. The interface frame 22 accommodates the user-actuation rocker paddle 24 and a user-actuation slider 26, which is provided in a top surface of the frame 22. Frame 22 also includes a light aperture 232 that accommodates a light pipe 103 (not shown in this view). Frame 22 also includes a retainer flange 226 that is disposed along a longitudinal edge of the frame 22. The retainer flange 226 includes a retainer tab 2660 disposed at either end thereof. The retainer tabs 2660 are inserted into apertures 305 (See FIG. 3) formed in the top major surface of the heat sink 30. The user-actuation slider 26 slides within an elongated slide slot 228 formed in the frame member 22. The device housing assembly 60 includes a separator member 600 coupled to a back body member 610. The back body member 610 includes screw terminals 12 that are configured to terminate the premise wiring.

In reference to FIG. 2, a latitudinal cross-sectional view of the power control device 10 depicted in FIG. 1 is disclosed. This view provides an illustration of how the user-interface paddle 24 is operatively coupled to the functional rocker switch 42. As disclosed in greater detail below, the functional switch 42 includes an integral leaf spring 422 at either end thereof. Each integral leaf spring 422 further includes a rocker switch contact point 424. The rocker switch contact point, as its name suggests, is the only surface of the functional rocker switch 42 that contacts the user-interface paddle 24.

Starting at the top of FIG. 2 and working downwardly, user-interface frame 22 is shown to include a retainer flange 226. The opposing side of the frame 22 includes an elongated slide slot that accommodates the user-interface slider 26 coupled to the functional dimmer actuator 52. The device housing 60 is shown to include a separator member 600 and a back body member 610. The electrical circuit assembly 100

(See, e.g., FIGS. 31-36) is implemented, at least in part, by a printed circuit board (PCB) 101. As shown in FIG. 2, the PCB 101 is disposed between the separator member 600 and the back body member. Thus, a portion of the electronic components, most of the functional rocker switch assembly 40 and the potentiometer 56 are disposed within a walled portion formed in the separator. The functional dimmer actuator 52 is configured to actuate the potentiometer, which in turn, regulates the amount of electrical power provided to the load. The remaining portions of the functional switch assembly 40 including movable switch contacts 46 and the stationary switch contacts are disposed under the PCB 101 in the back body portion 610.

FIG. 3 is a perspective view of the device depicted in FIG. 1 with the user interface 20 partially removed. As shown herein, the removable actuation interface 20 includes flexible retainer clips 222 that mate with apertures 302 in the heat sink 30. The anchor elements 224 and the flexible retainer clips 222 are substantially hidden from view when the frame member is connected to the heat sink. Note that the flexible retainer clips 222 and the anchor elements 224 are substantially in-board with respect to the lateral wall of the frame member 22. The user is made aware of the position of retainer clips 222 by way of indicia on the heat sink such as the words "OPEN." Moreover, because the retainer clips 222 and the anchors 224 are in-board with respect to the frame 22 and substantially hidden from view when the frame member is connected to the heat sink (since the snap-in portions are under the heat sink), the interchangeable assembly 20 accommodates a standard wall plate cover having a No. 26 opening.

Any number of aesthetic embodiments of the interface assembly 20 may be connected to the heat sink and operatively coupled to the functional switch 40 and dimmer 50. The term aesthetic embodiments refer to the colors, finishes, and/or various types of control surfaces implemented by the assembly 20. Control surfaces refer to the size, shape and other detailed implementations of the interface paddle 24 and/or the interface slide 26. The number of finishes can include metallic, leather, plastic, wood veneer, etc. The number of colors is limited only by one's imagination.

FIG. 3 also shows the functional switch assembly 40 and the functional dimmer assembly 50 in greater detail. Specifically, this view shows that rotational axis of the functional rocker switch 42 is located below the top major surface of the heat sink 30. Moreover, the integral leaf spring portions 422 are anchored near the rotational axis and their respective switch contact points 424 are disposed toward the top and bottom lateral edges of heat sink 30. The leaf spring/contact point combination (422/424) provides a smoother actuation when the user depresses the paddle switch 24.

The functional dimmer assembly 50 is shown to include the functional dimmer actuator 52 and a dimmer registration feature 54. The functional dimmer actuator 52 slides within the slide dimmer opening within the heat sink 30. The dimmer registration feature 54 is the means for coupling the user-interface slide 26 to the dimmer actuator 52. The functional dimmer actuator 52, of course, is coupled to the potentiometer that controls the fan speed or light level.

Figure 4:
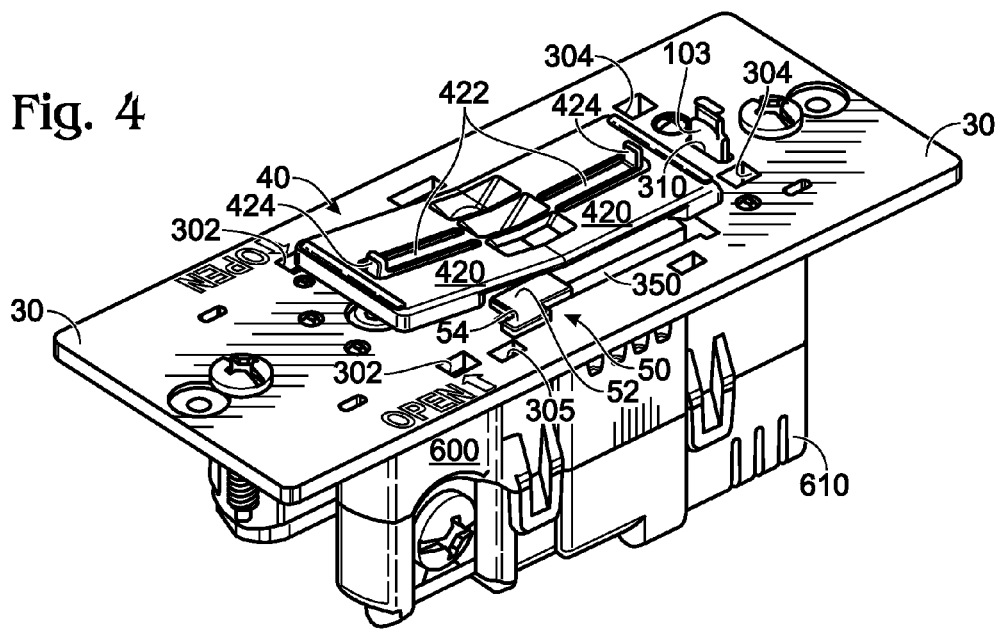
FIG. 4 is a perspective view of the device depicted in FIG. 1 with the user-actuation interface completely removed.

FIG. 4 is a perspective view of the device depicted in FIG. 1 with the user interface completely removed. The functional rocker 42, the integral leaf springs 422 and contact points 424 are shown more clearly in this view.

The heat sink 30 is shown to include several types of apertures configured to facilitate the coupling of the user-actuation interface 20. For example, the flex clip apertures 302 are configured to accommodate the flexible retainer clips 22 (frame 22) and the anchor apertures 304 are configured to receive the stationary anchors 224 (frame 22). As noted above, the retainer apertures 305 accommodate the retainer tabs 2660 of the retainer flange 226. Of course, the heat sink 30 includes mounting apertures 306 which accommodate the mounting screws 308 that fasten the device 10 to the device box. Finally, please note that the light pipe 103 extends from the top major surface of the heat sink 30 and mates with aperture 232 in frame 22 of the interface assembly 20 (not shown in this view).

Referring to FIG. 5, a topside detail view of a user-actuation interface assembly 20 depicted in FIG. 1 is disclosed. This view clearly shows a flexible retainer clip 222 at one side of frame 22, and anchors 224 at an end thereof. The light pipe aperture 232 referred to above is disposed at the same end of the frame 22 that includes the stationary anchors 224. As noted previously, the retainer flange 226 is disposed along each lateral side of the frame member 22 and provides lateral stability when a user depresses the interface paddle 24 or uses the interface slide 26.

In reference to FIG. 6, a detail view of the underside of the user-actuation interface assembly depicted in FIG. 5 is disclosed. Note that each longitudinal side of the frame 22 includes a hollow slide pocket 229 such that the interface slide 26 may be disposed on either side of the frame without any significant retooling. The hollow pocket 229 is configured to accommodate the user-interface slide body 260. The user-interface slide body 260 includes a slider registration feature 262 disposed in a central portion thereof, and a snap-in portion 264 disposed at either end. The slider registration feature 262 mates with the functional dimmer registration feature 54 depicted in FIG. 4. The frame member 22 is shown to include Trunions 220 that are snapped into the trunion sleeves 240 on either side thereof. The trunion sleeves are formed in the interior of the interface paddle 24. The interface frame 22 also includes a light pipe compartment 230 formed between the stationary anchors 224. The light pipe 103, as noted previously, extends from the top major surface of the heat sink 30 and is inserted into the light pipe compartment 230 when the interface assembly 20 is coupled to the heat sink 30. The light pipe compartment 230 is configured such that the top end of the light pipe is registered and aligned with the light pipe aperture disposed on the top edge of frame 22 (See FIG. 5).

FIG. 7 is an exploded view of the user-actuation interface assembly depicted in FIG. 5 and FIG. 6. This view shows the structure of the interface slide 26, the slide body 260, and slide registration member 262 in greater detail. Moreover, this view also shows how the trunions 220 of the interface paddle 24 snap into the trunion sleeves 240.

In reference to FIG. 8, a longitudinal cross-sectional view of the device 10 depicted in FIG. 1 is disclosed. In this view the underside of the interface paddle 24 is shown to be supported only by the rocker contact points 424 (of the functional rocker switch 42). Of course, the contact points 424 are extensions of the integral leaf springs 422. As noted previously, the pivot point of the functional rocker is disposed underneath the surface of the heat sink 30. Stated differently, the pendulum switch actuator 44 of the functional rocker assembly 40 is disposed within the compartment formed by the separator member 600 and the PCB 101. The pendulum switch actuator 44 is coupled to the movable switch contact 46 in the manner shown. The stationary contacts 48 are disposed on either side of the movable contact 46 such that a user initiated depression of the left side (in FIG. 8) of the interface paddle 24 will cause the functional switch 42 to toggle the movable switch 46 to the left most stationary contact 48. Of course, the rocker switch 46 is configured to switch back and forth between the two switch positions.

FIG. 8 also shows LED 105 operatively connected to PCB 101. The light pipe 103 is in optical communication with the LED such that the light emitted by LED 105 is directed through the light pipe 103 and out of the aperture 232.

Figure 9:
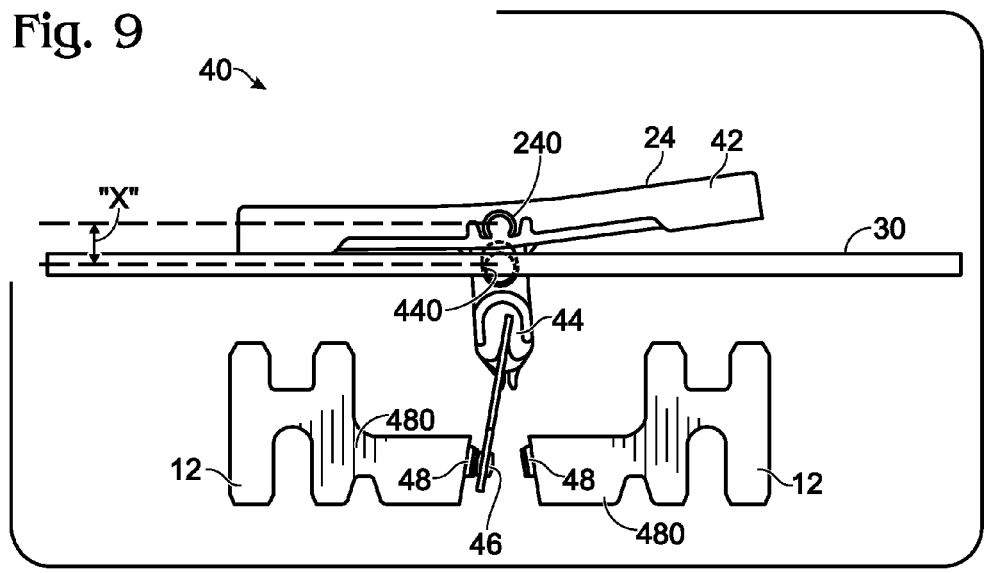
FIG. 9 is a detail cross-sectional view of the rocker switch mechanism depicted in FIG. 1.

FIG. 9 is a detail cross-sectional view of the rocker switch mechanism depicted in FIG. 1. The functional rocker switch 42 includes trunions 440 on either side thereof that mate with sleeve portion formed in the separator 600 (not shown in this view). Thus, the axis of rotation of the user-actuation paddle 24 (implemented by trunions 220) is offset from the axis of rotation of the functional rocker switch 40 (implemented by trunions 440). By stacking the axes of rotation, the width of the frame member 22 can be minimized such that the user interface assembly 20 can fit within standard wall plate openings (See, e.g., NEMA No. 26 opening which is about 1.3 inches by 2.6 inches). This feature is enabled by the user-actuation paddle 24 being disposed over the rocker switch 42 but being detached therefrom. The interface paddle interior surface 246 slides over the rocker switch major surface 420 and the rocker switch contact point 424. Moreover, this relationship allows the user interface assembly 20 to be easily connected to the heat sink 30 without having to interconnect the interface paddle 24 and the functional rocker switch 42. The axis of rotation of the functional rocker assembly 40 is, of course, determined by the pendulum switch actuator 44 as shown herein. FIG. 9 also depicts the stationary contacts 48 as being part of an integrally formed conductive screw terminal members 12.

Figure 10:
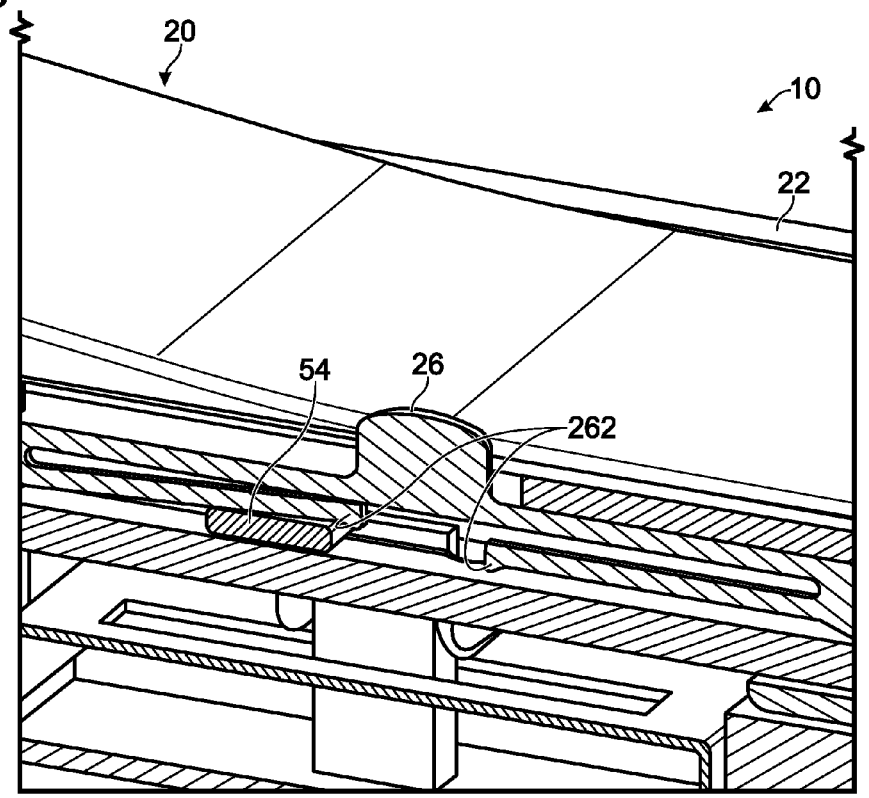
FIG. 10 is a longitudinal cross-sectional view illustrating a self-aligning feature of the user-actuation interface assembly.

FIG. 10 is a longitudinal isometric cross-sectional view illustrating a self-aligning feature of the user-actuation interface assembly 20. In this view, the assembly 20 is in the process of being coupled to the heat sink 30 and the functional dimmer assembly 50. The interface slide mechanism 26 includes a registration feature 262 formed in the underside thereof, but note that in this view, the functional dimmer registration element 54 is not seated in the interface registration feature 262. The registration is shown in detail in FIGS. 11A-C.

Figure 11A:
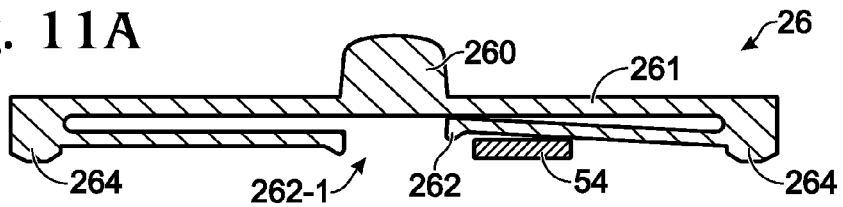
FIGS. 11A-C are detail view of the self aligning feature depicted in FIG. 10.
Figure 11B:
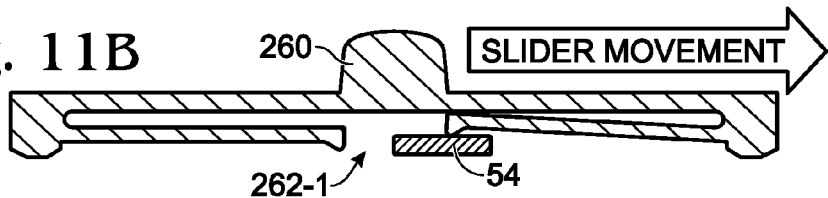
Figure 11C:
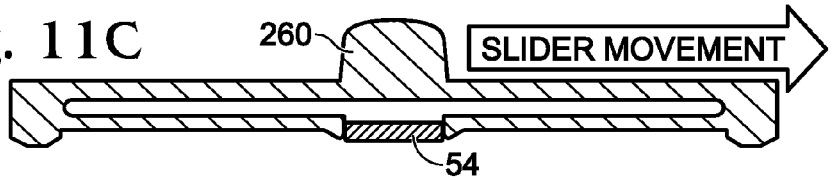
Figure 12:
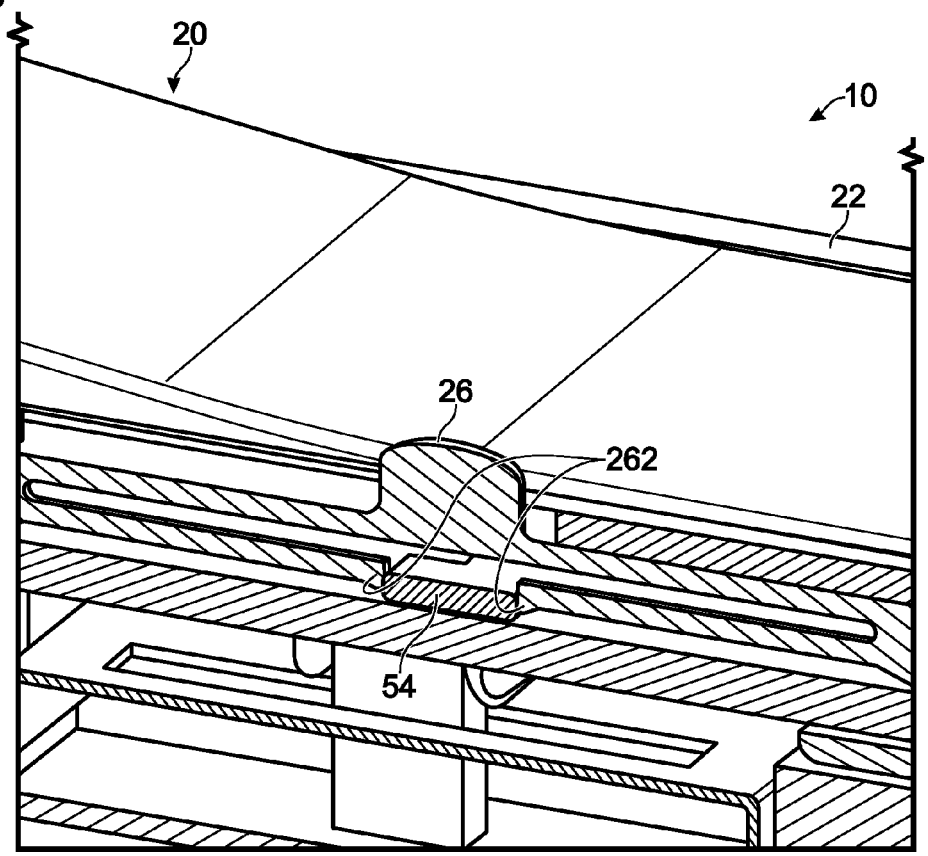
FIG. 12 is a longitudinal cross-sectional view illustrating the self-aligning feature of FIG. 10 in the aligned state.

FIGS. 11A-C are detail views of the self aligning feature depicted in FIG. 10. In FIG. 11A, the user is sliding the interface slide 26 within the elongated slot 228 in the direction shown. One side of the self-aligning slide registration element 262-1 is pressed upwardly by the functional slide registration feature 54. In FIG. 11B, the functional slide registration feature 54 glides over the self-aligning slide registration element 262-1 and into the interface slide registration opening 262. In FIG. 11C, when the functional slide registration feature 54 clears the self-alignment feature 262-1, it snaps into the registration opening 262. At this point, the interface slide mechanism 26 is in registration with the functional solder 52, and when the user moves the interface slider 26 the functional slider 54 moves in unison. FIG. 12 is a longitudinal isometric cross-sectional view illustrating the self-aligning feature of FIG. 10 in the aligned state.

Figures 13, 14:
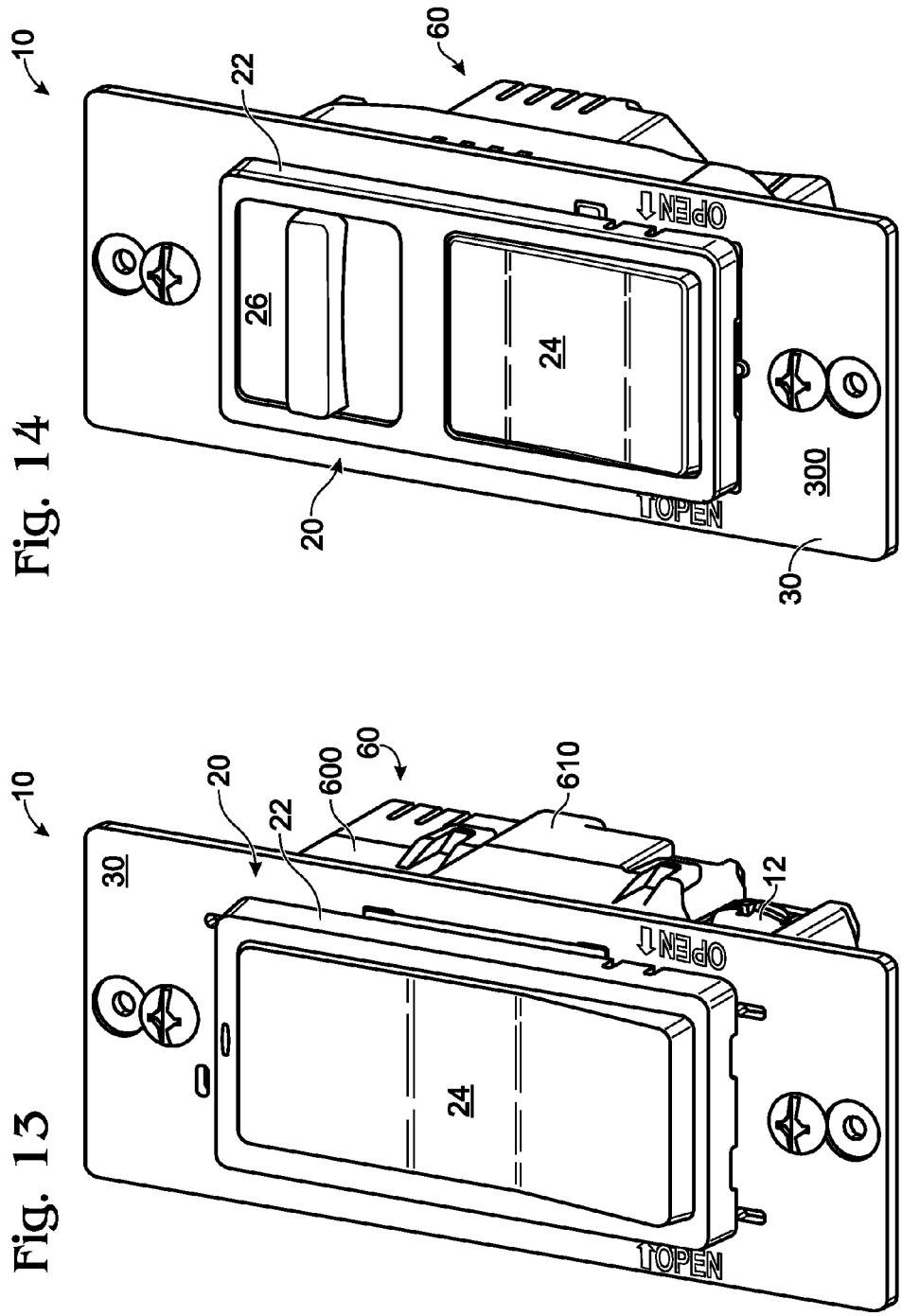
FIG. 13 is a perspective view of a power control device in accordance with a second embodiment of the present invention.
FIG. 14 is a perspective view of a power control device in accordance with a third embodiment of the present invention.

As embodied herein and depicted in FIG. 13, a perspective view of a power control device in accordance with a second embodiment of the present invention is disclosed. The user-actuation assembly 20 includes an interface frame 22 that is snapped into mating apertures formed in the metallic mounting plate 30. The interface frame 22 accommodates the user-actuation rocker paddle 24. Frame 22 also includes a light aperture 232 that accommodates the light pipe 103 (not shown in this view). Like the previous embodiments, frame 22 includes a retainer flange 226 that is disposed along a longitudinal edge of the frame 22. The device housing assembly 60 includes a separator member 600 coupled to a back body member 610. The back body member 610 includes screw terminals 12 that are configured to terminate the premise wiring. Thus, this device is similar to the embodiment of FIG. 1, but is directed to a rocker switch embodiment without a dimmer As embodied herein and depicted in FIG. 14, a perspective view of a power control device 10 in accordance with a third embodiment of the present invention is disclosed. In this embodiment, the user-actuation interface 20 includes actuation paddle 24 at one end of the device and a relatively wide actuation slide 26 at the other end of the device.

Figure 15:
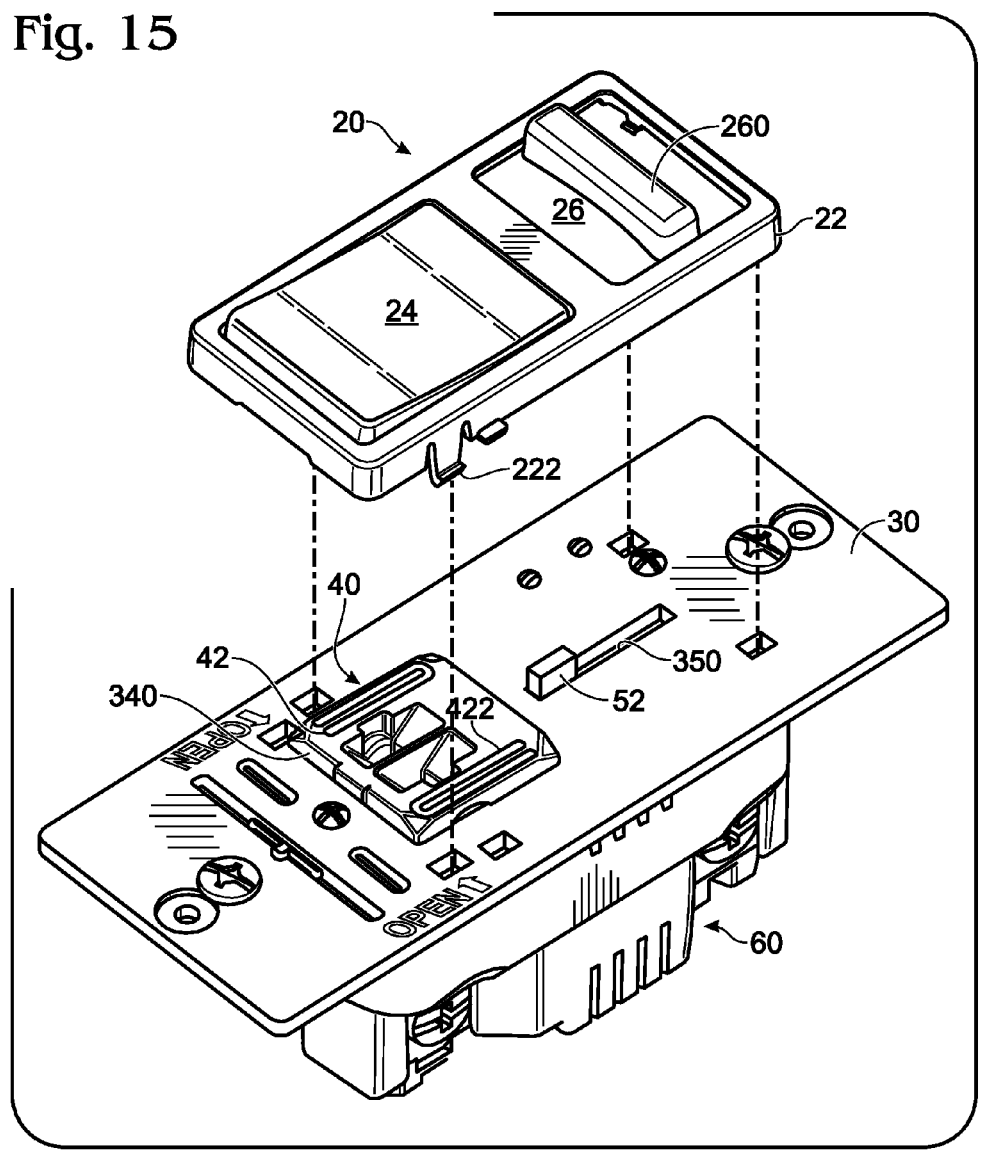
FIG. 15 is a perspective view of the device depicted in FIG. 14 with the user interface completely removed.

Referring to FIG. 15, a perspective view of the device depicted in FIG. 14 with the user interface completely removed is disclosed. Like the embodiment of FIG. 1, frame 22 includes flexible retainer clips 222 and stationary anchors 224 that mate with apertures formed in the heat sink 30. Accordingly, any discussion of these apertures is omitted for the sake of brevity. The functional dimmer actuator 52 is shown to protrude from heat sink opening 350 and it mates with the interface slide actuator 260. The functional rocker switch 42 is a smaller version of the one depicted in FIG. 1. On one lateral side of the functional rocker 42, the integral leaf spring 422 extends in a direction toward the top of the device, and on the other side, the second integral leaf spring extends in an opposite direction toward the bottom edge of the device 10. Once again, the axis of rotation of the functional rocker switch 42 is below the top major surface of the heat sink 30.

Figure 16:
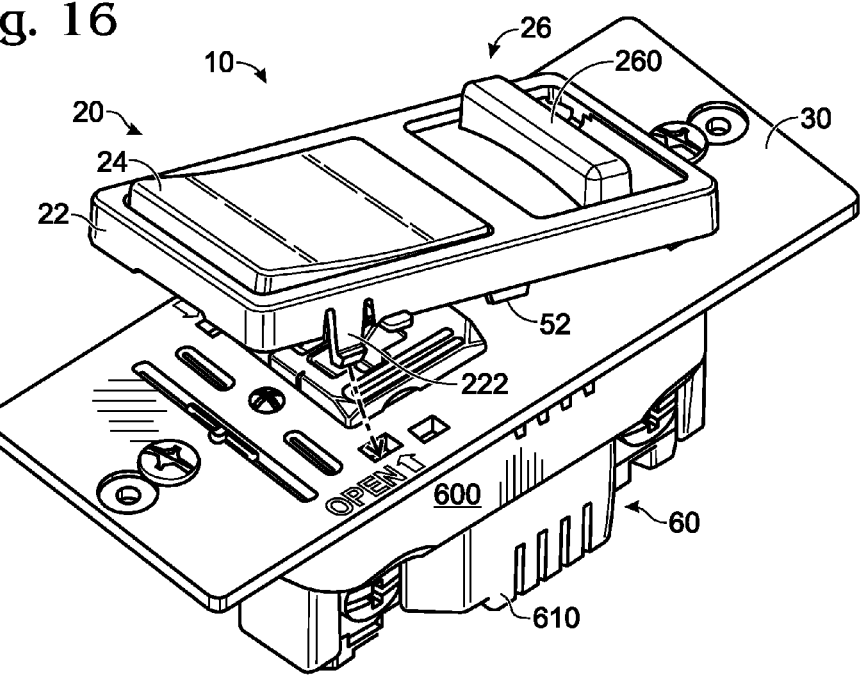
FIG. 16 is a perspective view of the device depicted in FIG. 14 with the user interface partially removed.

In reference to FIG. 16, a perspective view of the device 10 depicted in FIG. 14 with the user interface partially removed is disclosed. In this view, the stationary anchors (not visible) have been inserted into apertures formed in the heat sink 30 such that the flexible clips 22 can be inserted into their respective coupling apertures. This view also shows a portion of the functional dimmer actuator. After the stationary anchors are inserted into their respective heat sink apertures, the functional dimmer actuator 52 must be aligned with a mating registration feature 262 in the slide mechanism 26 before the flex clips 22 can be inserted.

Figure 17:
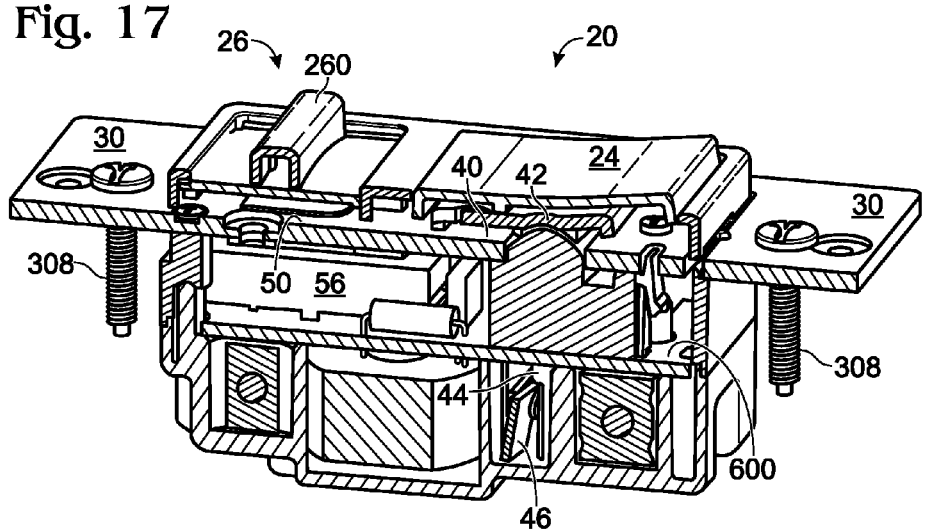
FIG. 17 is a longitudinal cross-sectional view of the device depicted in FIG. 14.

Referring to FIG. 17, a longitudinal cross-sectional view of the device depicted in FIG. 14 is disclosed. The interface slide 26, as before, is positioned over the functional dimmer assembly 50 such that the interface slider 26 and the functional slider 52 move in unison to actuate the potentiometer 56. At the other end of device 10, the interface paddle 24 is positioned over the functional switch 42 such that these elements move in unison such that the pendulum switch actuator 44 toggles the movable switch contact 46 between the stationary contacts 48 (not shown in this view).

Figure 18:
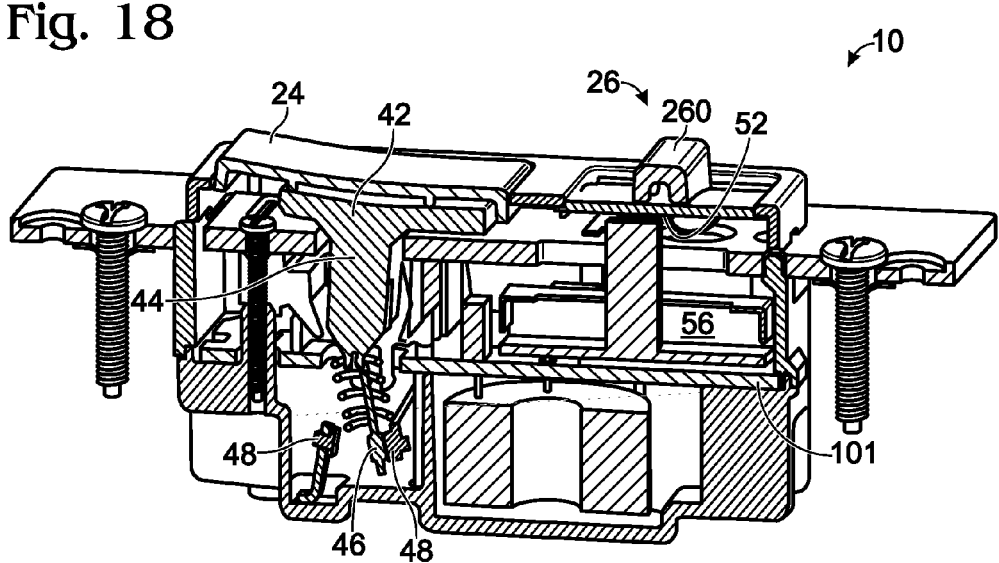
FIG. 18 is another longitudinal cross-sectional view of the device depicted in FIG. 14.

In FIG. 18, a second longitudinal cross-sectional view of the device depicted in FIG. 14 is disclosed. This view shows the pendulum switch actuator 44, movable switch contacts 46 and the stationary contacts 48 more clearly. In addition, the functional dimmer slide 52 is shown inside the interface slider 26. Again, these elements move in unison to change the resistivity of the potentiometer 56. As shown in detail in the electrical schematic diagrams, the potentiometer varies the amount of power delivered to the load (e.g., fan speed, or light intensity) under the control of the consumer/user.

Figure 19:
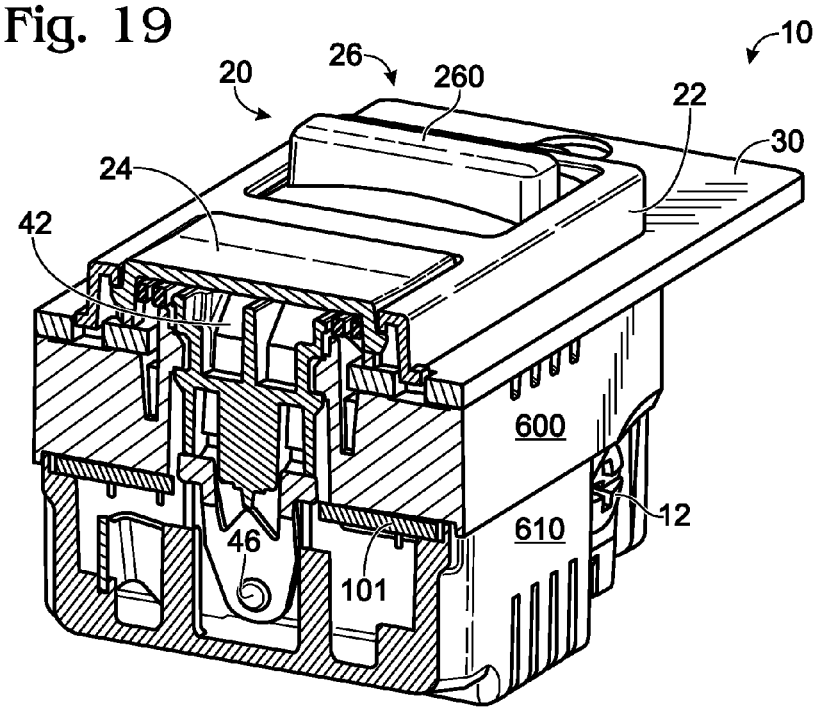
FIG. 19 is a latitudinal cross-sectional view of the device depicted in FIG. 14.

FIG. 19 is a latitudinal cross-sectional view of the device depicted in FIG. 14. The sectional line in this view is through the rocker switch assemblies (24, 50). In particular, the pendulum switch actuator is shown connected to the movable contact 46 which extends through an opening in the PCB 101 into the back body portion 610 of the device 10.

Figure 20:
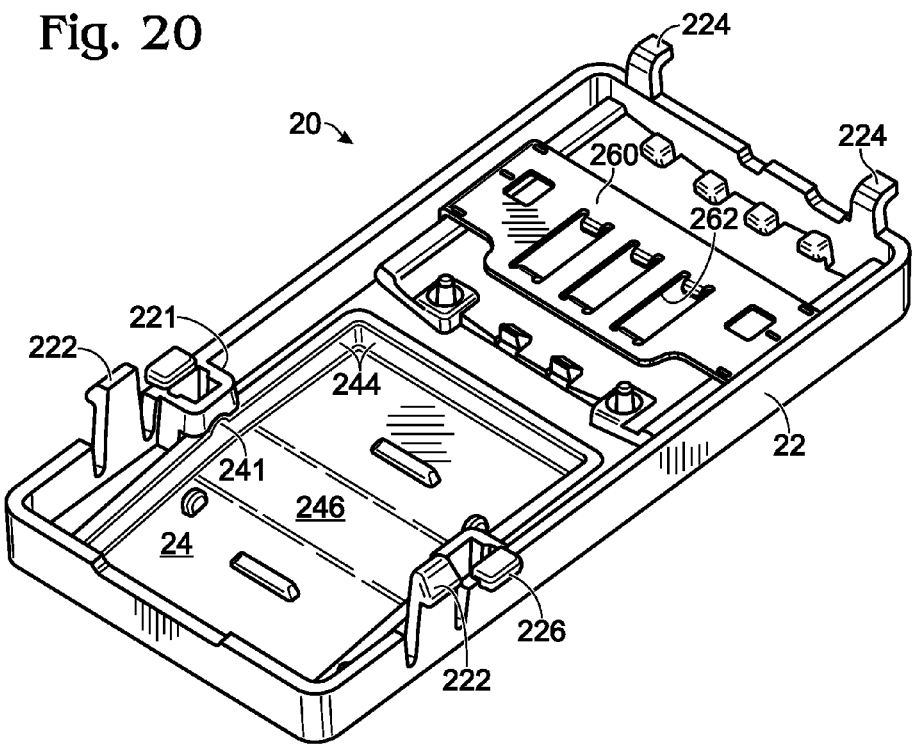
FIG. 20 is a detail view of the underside of the user-actuation interface assembly depicted in FIG. 14.

In reference to FIG. 20, a detail view of the underside of the user-actuation interface assembly depicted in FIG. 14 is disclosed. The construction of the frame 22 is similar in principle to the frame depicted in FIG. 1, in that it includes stationary anchors 224 and flexible clips 222. The construction of the interface switch paddle 24 is also similar to that depicted in FIG. 1, but obviously at a smaller scale. Note, however, that in this embodiment, the trunion sleeve 221 is incorporated as part of the frame member 22. The trunions 241 are incorporated as part of the interface paddle 24. This arrangement is the reverse of the arrangement employed in the first embodiment. Another difference relates to the means used to register the functional slide mechanism 52 and the interface slider 26. Stated briefly, the interface slide mechanism 26 includes an interface slide actuator 260 that has a registration slot 262 configured to accommodate the functional dimmer actuator 52.

Figure 21:
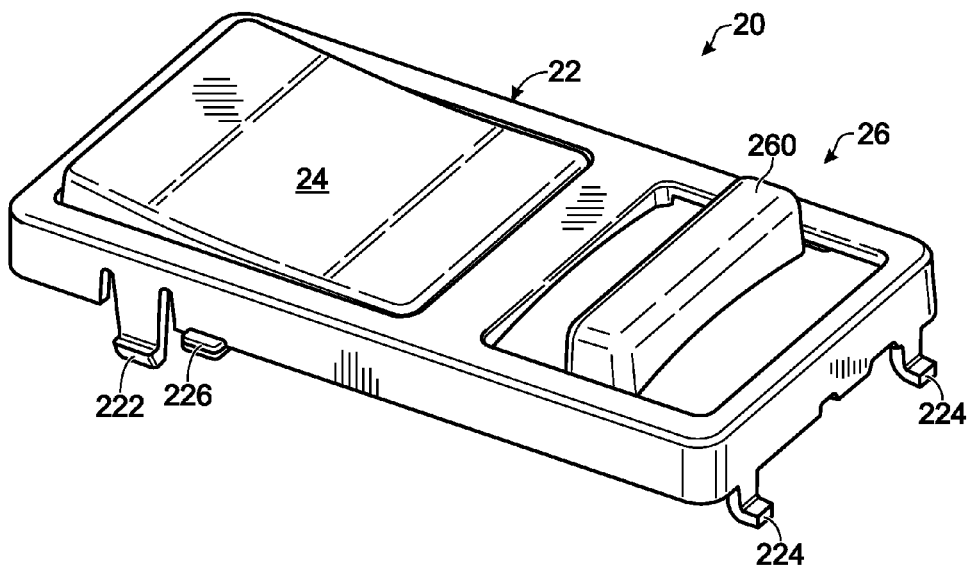
FIG. 21 is a topside detail view of the user-actuation interface assembly depicted in FIG. 20.

FIG. 21 is a topside detail view of the user-actuation interface assembly depicted in FIG. 17. As noted previously, the means for connecting the frame to the heat sink 30 are identical to those employed in the first embodiment. The interface paddle 24 and the interface slider 26 were discussed above.

Figure 22:
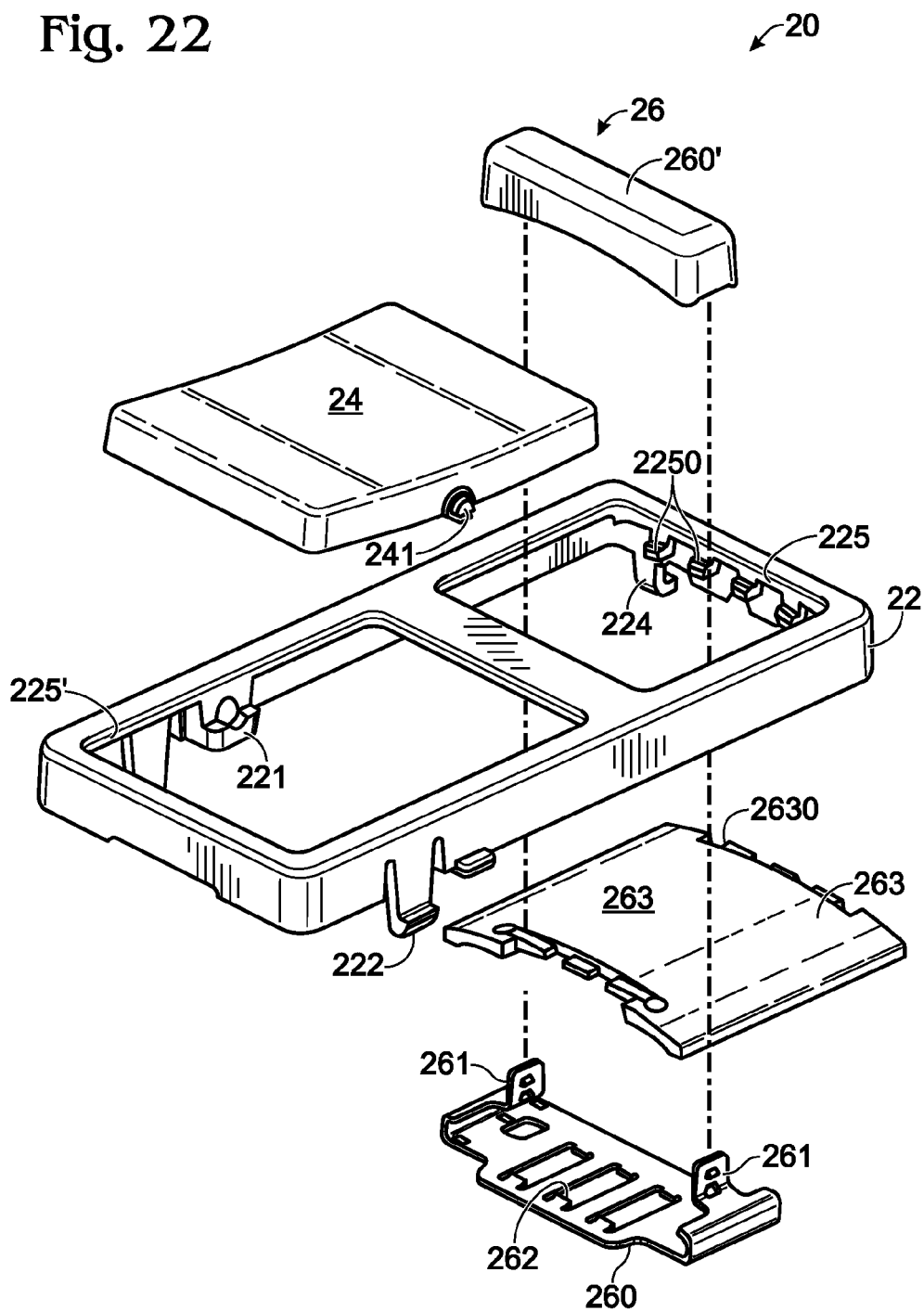
FIG. 22 is an exploded view of the user-actuation interface assembly depicted in FIG. 20.

FIG. 22 is an exploded view of the user-actuation interface assembly depicted in FIG. 17. Frame 22 includes two windows (225, 225') that accommodate the interface slider 26 and the interface paddle 24, respectively. The window 225 includes window retainer elements 2250 that mate with snap-in elements 2630 disposed on the interface slide plate 263. The interface slide actuator 260 wraps around the slide plate 263 such that the slide connection elements 261 extend from the top surface of plate 263. At this point, the interface slider 260' is snapped into the connectors 261. Finally, the entire interface slider assembly 26 is snapped into the window 225.

Figure 23:
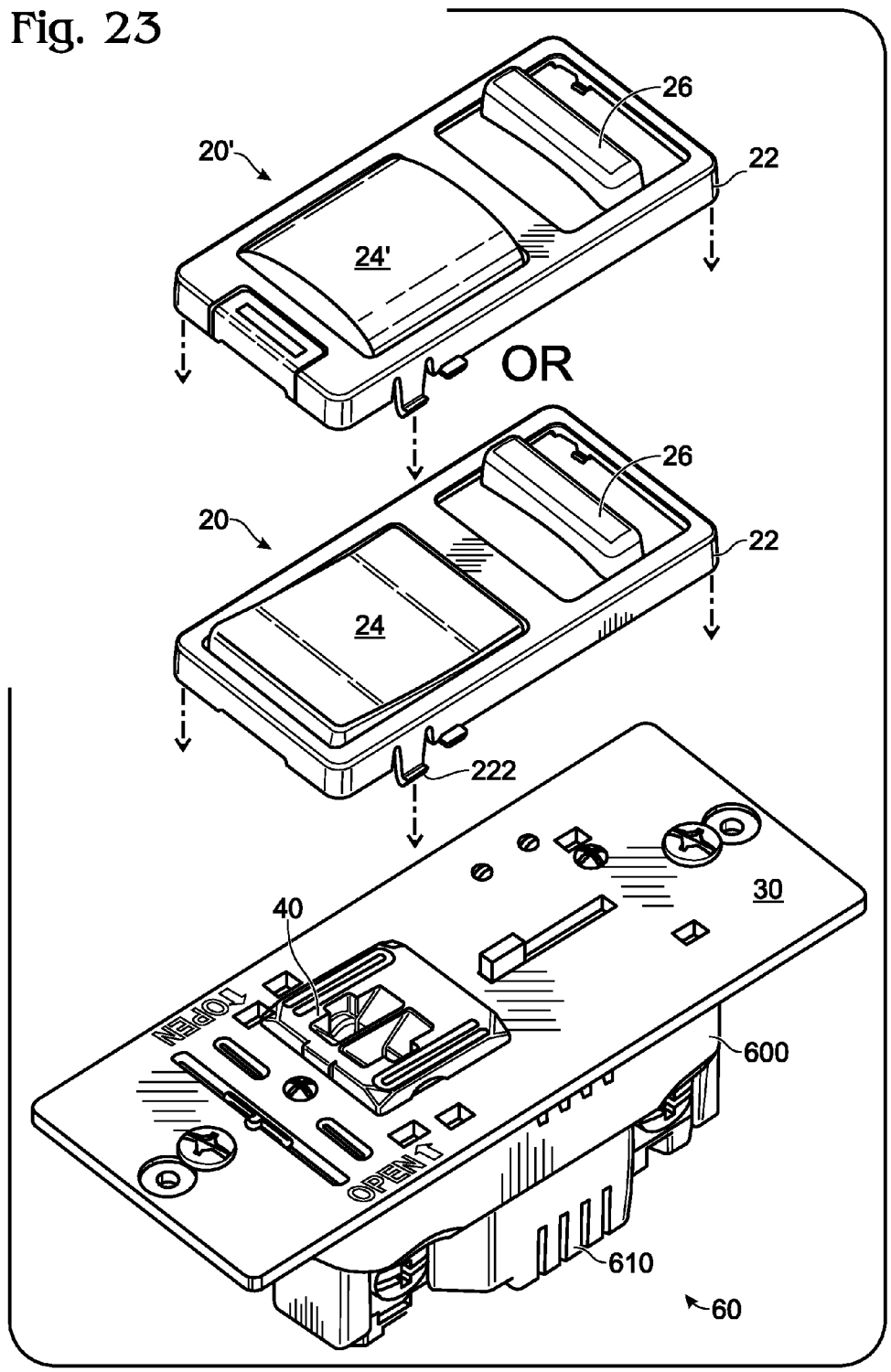
FIG. 23 is a perspective view of the power control device of FIG. 20 showing alternate user-actuation interface embodiments.

FIG. 23 is a perspective view of the power control device of FIG. 14 showing alternate user-actuation interface embodiments. While only two user-actuation interface embodiments are shown herein, any number of aesthetic embodiments 20 configured to attach to the functional switch 40 and dimmer 50 may be employed. The interface slide dimmer 26 in each embodiment was described above in detail. In actuation interface assembly 20', a stylistically different paddle 24' is employed instead of the rocker 20.

Figure 24:
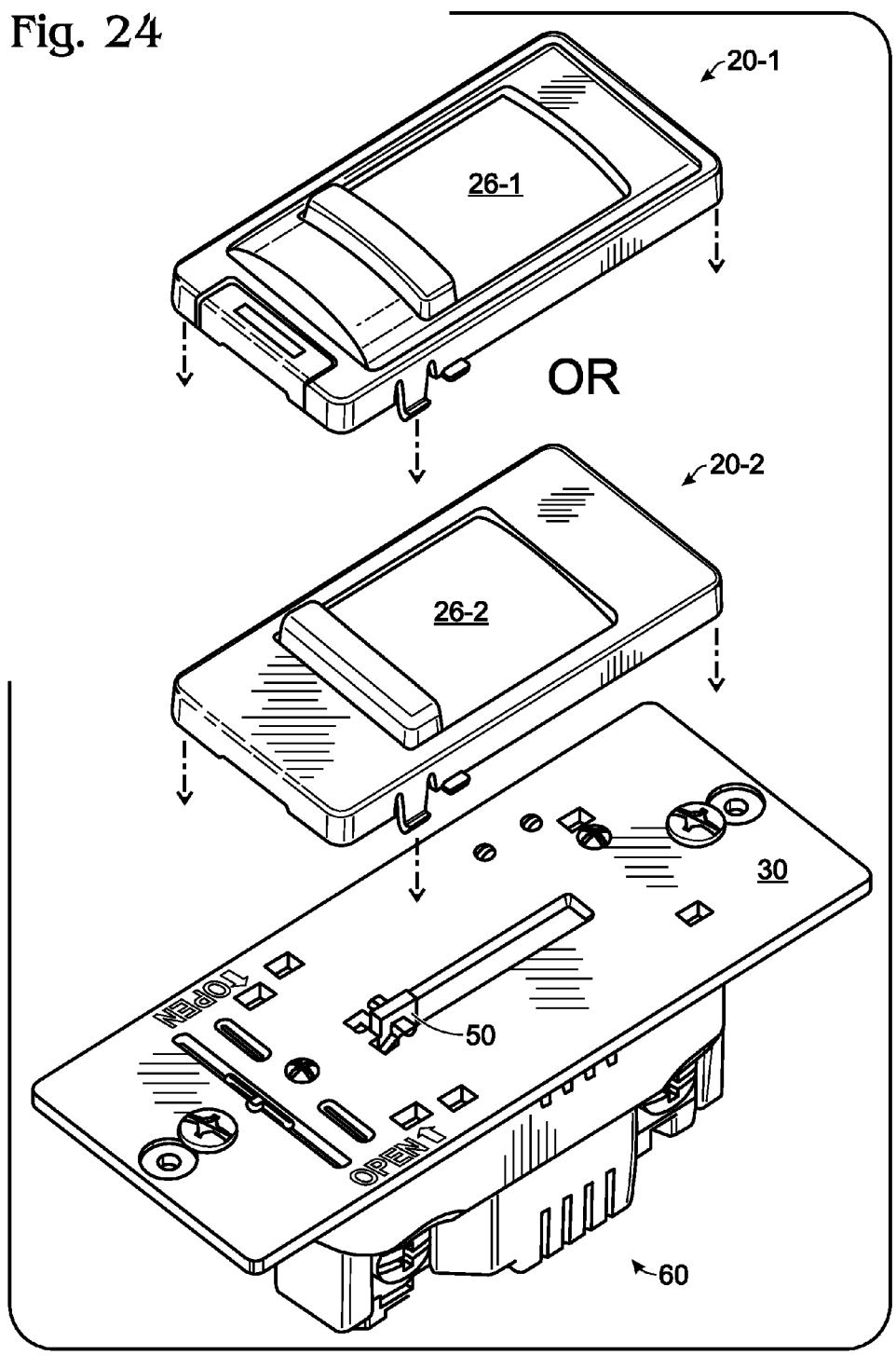
FIG. 24 is a perspective view of a power control device in accordance with a fourth embodiment of the present invention.

As embodied herein and depicted in FIG. 24, a perspective view of a power control device in accordance with a fourth embodiment of the present invention is disclosed. In this embodiment, the power control device includes only a functional dimmer 50 and thus only interface slide dimmers 26-1 or 26-2.

Figure 25:
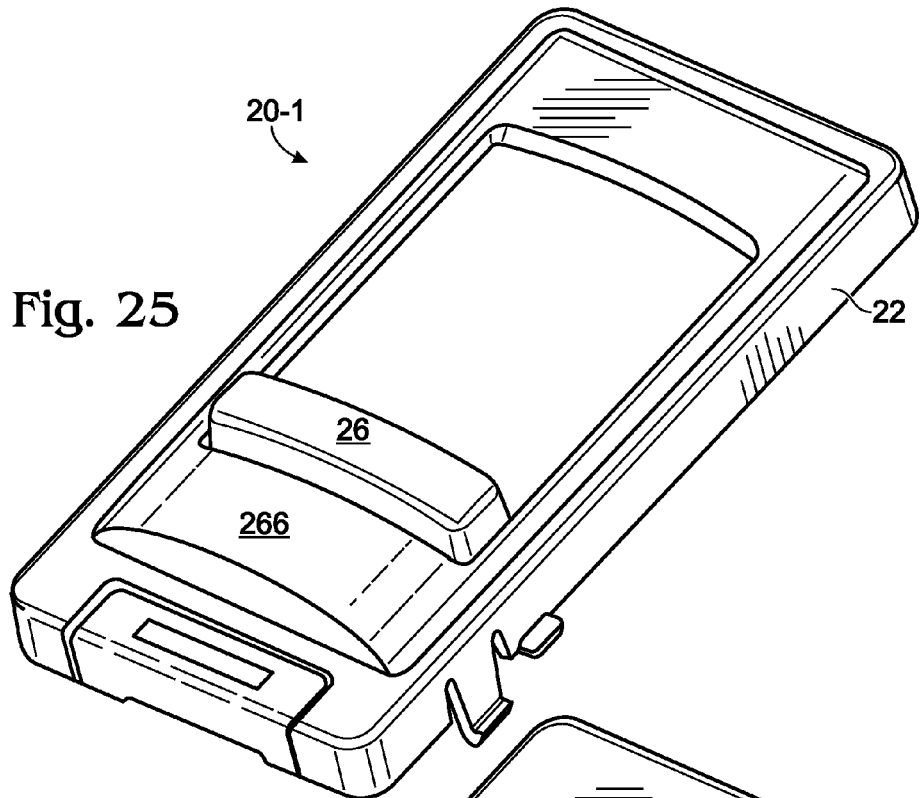
FIG. 25 is a topside detail view of one of the user-actuation interface assemblies depicted in FIG. 24.
Figure 26:
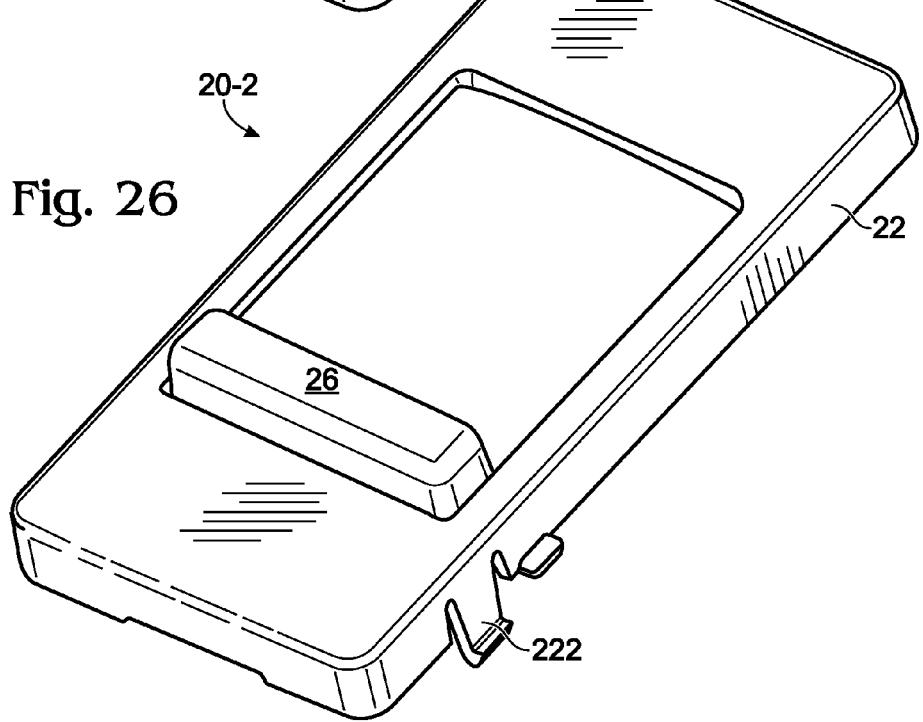
FIG. 26 is a topside detail view of another of the user-actuation interface assemblies depicted in FIG. 24.

FIG. 25 is a topside detail view of one of the user-actuation interface assembly depicted in FIG. 24. The user actuation interface 20 features a barrel shaped cover 266 that accommodates the interface slide 26. FIG. 26 is a topside detail view of the other user-actuation interface assembly 20-2 depicted in FIG. 24.

Figure 27:
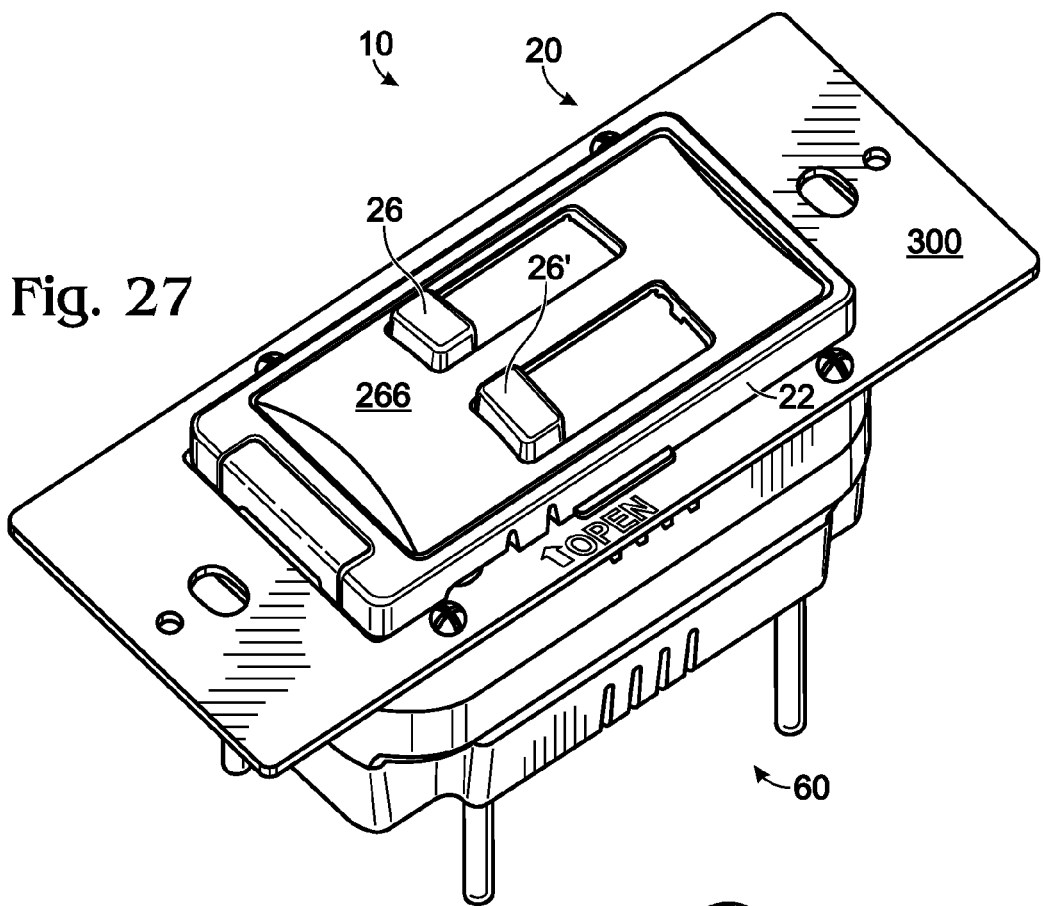
FIG. 27 is a perspective view of a power control device in accordance with a fifth embodiment of the present invention.
Figure 28:
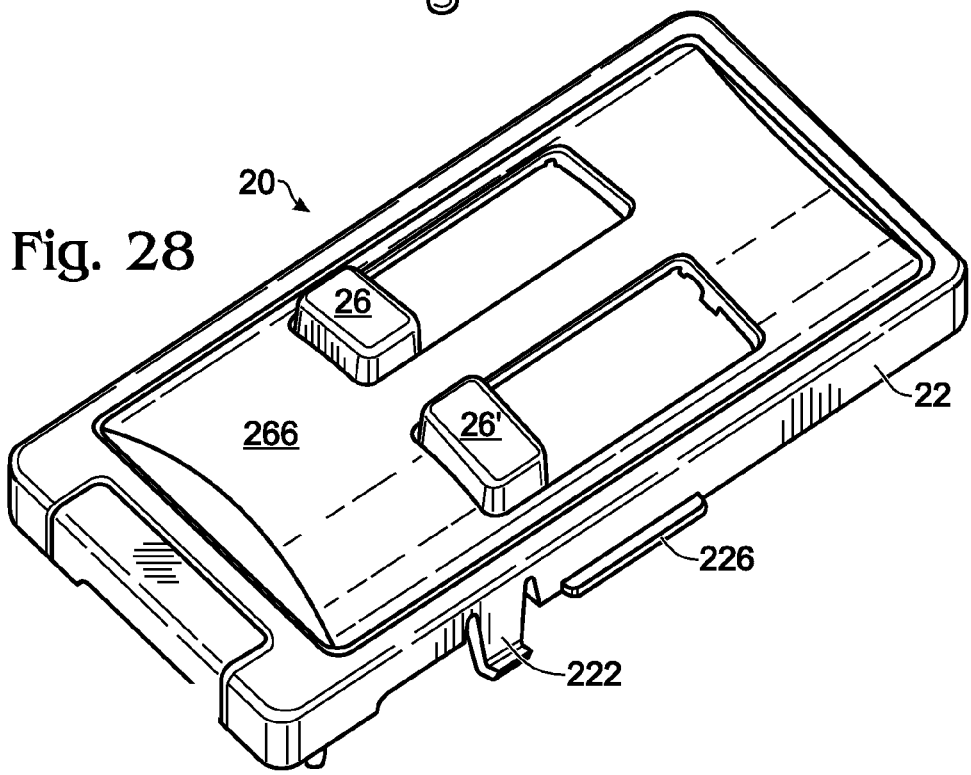
FIG. 28 is a topside detail view of the user-actuation interface assembly depicted in FIG. 27.
Figure 29:
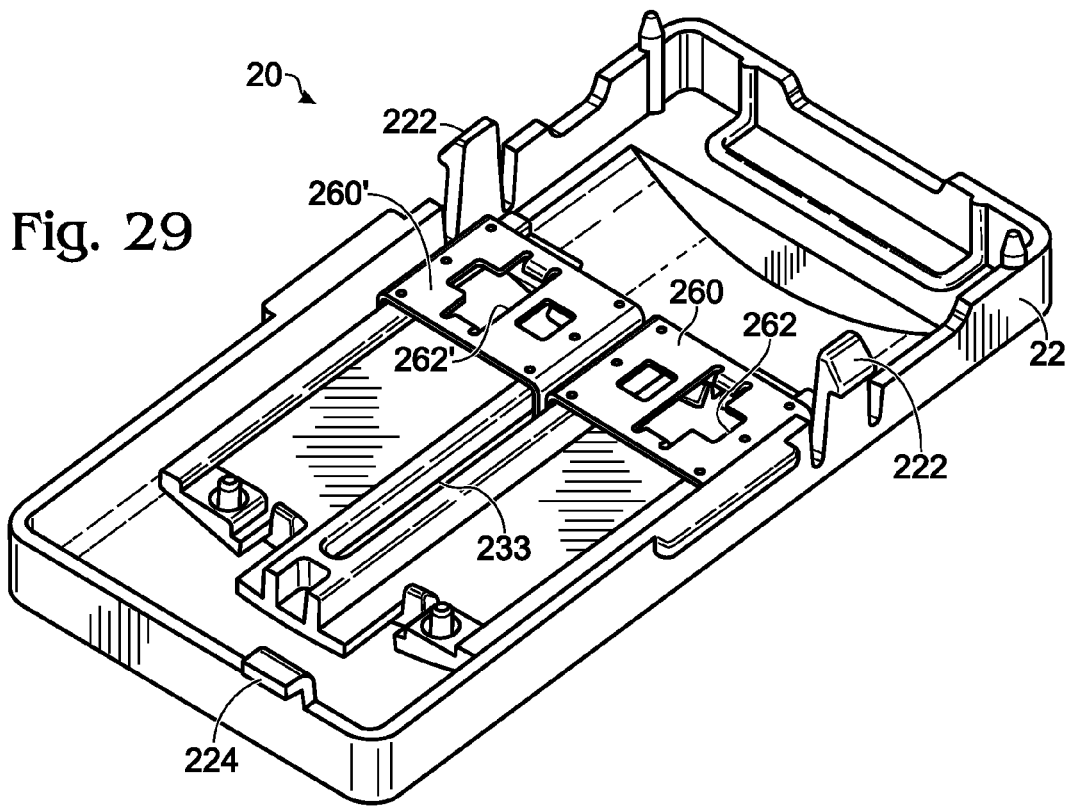
FIG. 29 is a detail view of the underside of the user-actuation interface assembly depicted in FIG. 27.

As embodied herein and depicted in FIG. 27, a perspective view of a power control device in accordance with a fifth embodiment of the present invention is disclosed. This device includes a barrel shaped cover member 266 that includes a first user actuation slider 26 and a second user actuation slider 26'. FIG. 28 is a topside detail view of the user-actuation interface assembly depicted in FIG. 27 and FIG. 29 is a detail view of the underside of the user-actuation interface assembly depicted in FIG. 27. The slide mechanism construction depicted in FIG. 29 is similar to other embodiments, but further includes an interior slot 233 that accommodates the slide actuator bodies (260, 260') for each interface switch 26, 26'. Each body 260, 260' includes a corresponding registration feature 262, 262'.

Figure 30:
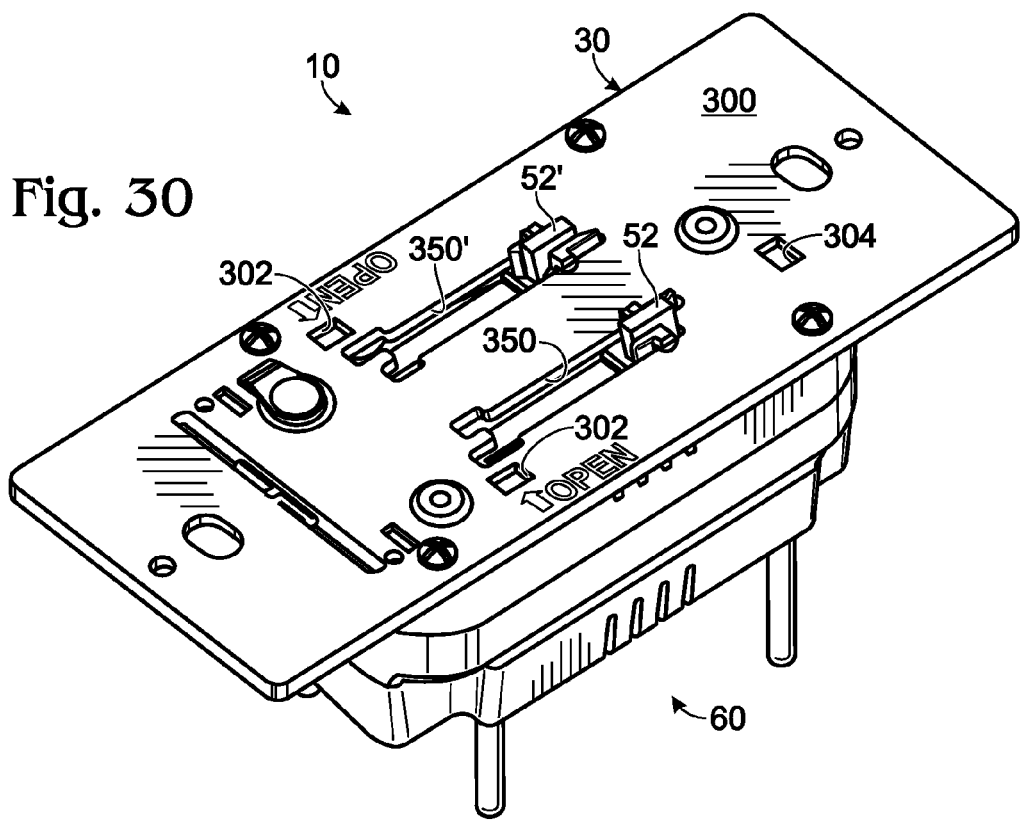
FIG. 30 is a perspective view of the device depicted in FIG. 27 with the user-actuation interface completely removed.

FIG. 30 is a perspective view of the device depicted in FIG. 27 with the user interface completely removed. The functional dimmer actuator 52 mates, of course, with the registration feature 262 of the first interface slider 26 and the functional dimmer actuator 52' mates with the with the registration feature 262' of the second interface slider 26'.

Referring to FIGS. 31A-31D, schematic diagrams illustrating a power control system 1000 that employs three-way switches 100 disposed in an AC branch circuit 1 to control an electrical load from two (or more) locations. The electrical load is depicted as an incandescent light L, but those skilled in the art will appreciate that the electrical load may comprise a lighting load or an electro-mechanical load such as an electrical fan. The mechanical embodiment of the device 10 is shown to include terminals 150 that are used to connect the device 10 to the AC branch circuit 1. Reference element 10 is employed to show that any of the suitable mechanical embodiments depicted in FIGS. 1-30 may be employed herein. Those skilled in the art will also appreciate that the power control circuits depicted in FIGS. 31A-31D may also be implemented using any of the circuits depicted in FIGS. 32-36.

Figure 31A:
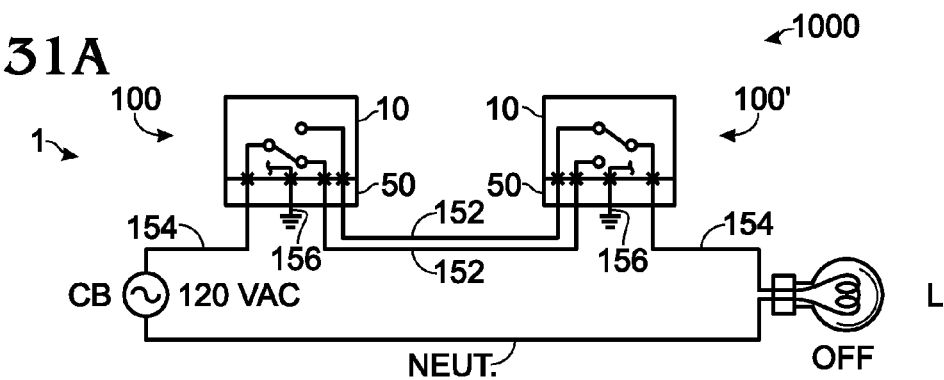
FIGS. 31A-31D are schematic diagrams illustrating a power control system employing the power control devices depicted in FIGS. 32-36.
Figure 31B:
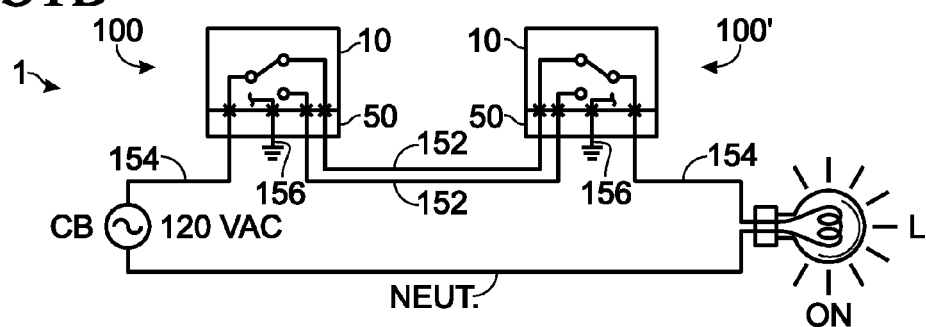
Figure 31C:
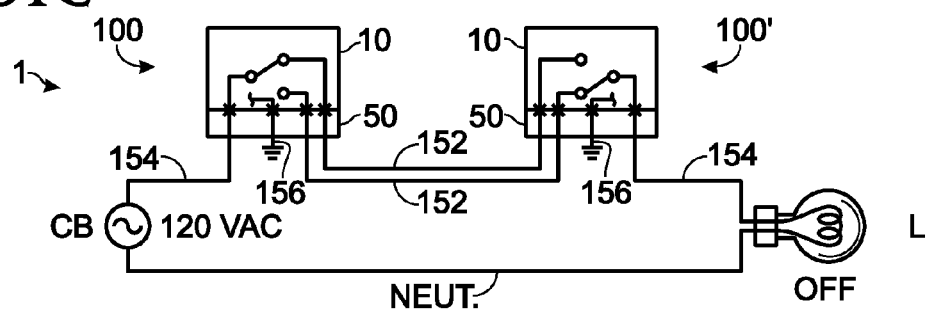
Figure 31D:
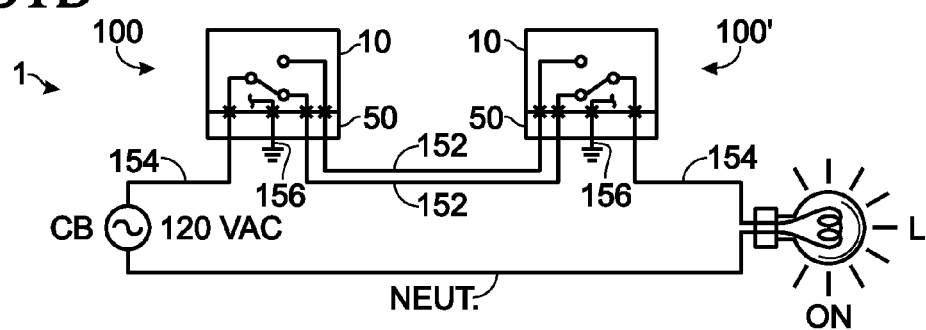

A first system 100 is connected to an upstream circuit breaker CB by way of common conductor 154. A ground conductor 156 is show schematically; in practice, it is typically connected to the ground strap in device 10 via one of the terminals 150. The first system 100 is also connected to two traveler conductors 152 which extend between the first system 100 and the second system 100'. The second system 100' is connected to load L via common conductor 154. The load L is, of course, connected to a neutral conductor that extends back to the circuit breaker CB to complete the circuit. In FIG. 31A, the switch systems 100 and 100' are positioned such that the light L is OFF. In FIG. 31B, switch system 100 is actuated at its location to provide power to light L to turn it ON. In FIG. 31C, switch system 100' is actuated to turn the light OFF. Finally, FIG. 31D shows system 100 being switched to its original position in FIG. 31A, to turn the light L back ON. FIGS. 31A-31D are provided to help the reader better understand the following diagrams.

Figure 32:
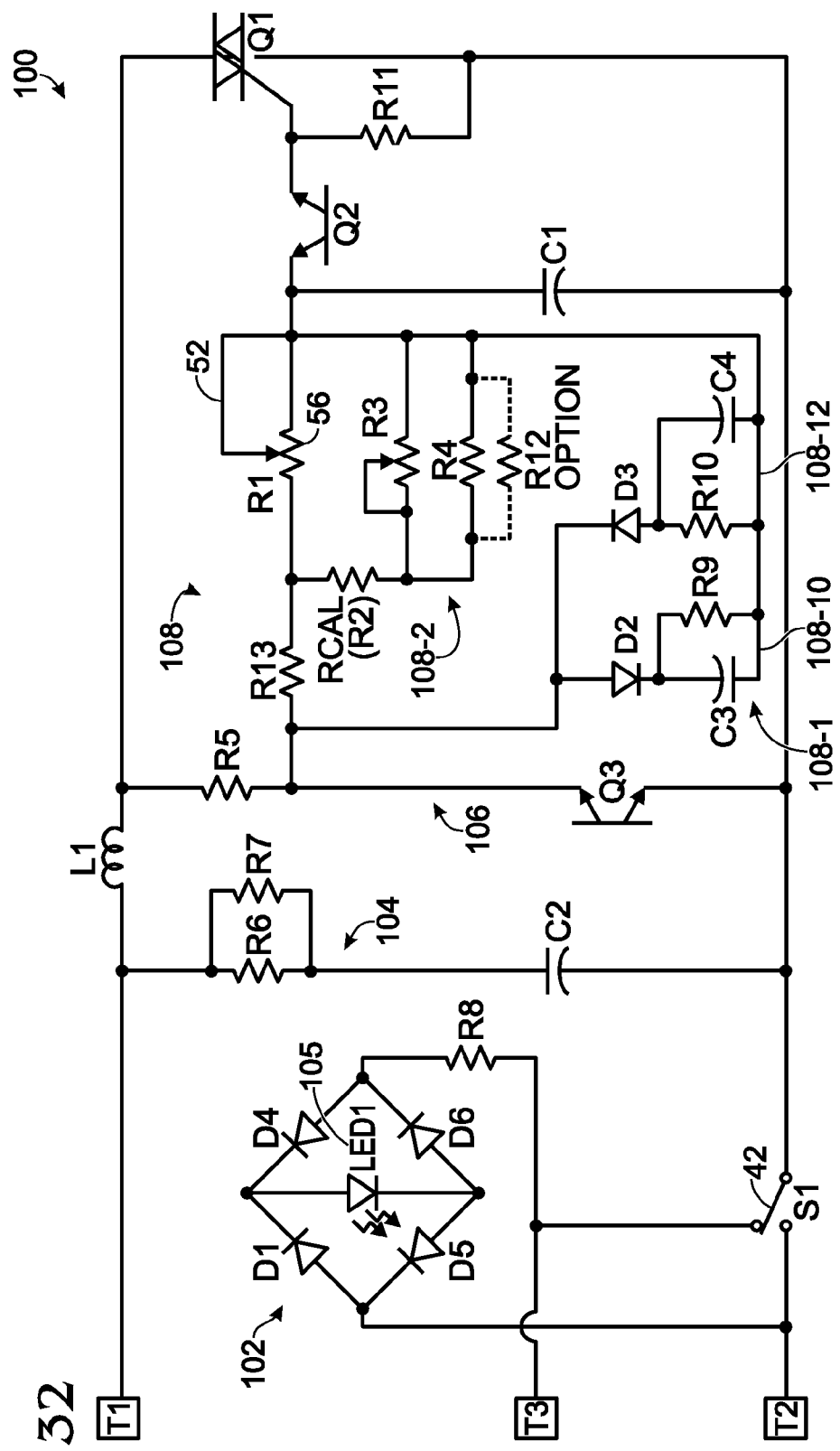
FIG. 32 view of a power control device in accordance with another alternate embodiment of the present invention.

As embodied herein and depicted in FIG. 32, a schematic view of a power control device in accordance with another alternate embodiment of the present invention is disclosed. This embodiment is directed to a rocker switch and dimmer configured to accommodate a fluorescent lighting element. Terminal T1 is configured to be connected to the common conductor 154 shown in FIG. 31. Terminals T2 and T3 are configured to be connected to the traveler conductors 152. A full wave rectifier bridge 102 is connected between the traveler terminals (T2, T3). When the functional switch 42 is in the position shown, the circuit 100 is turned OFF such that it is not regulating the load and LED1 is turned ON. In essence LED1 is in series with the load. Thus, LED1 functions as a locator when the device 10 (circuit 100) is in a darkened space/room. The bridge rectifier circuit 102 provides the LED1 with full wave rectified pulsed DC power. Because rectified DC is provided during both half-cycles, the LED1 appears to emit a brighter light when it is ON vis á vis a single diode rectifier. Moreover, the bridge rectifier 102 is only connected to the LED1 such that it does not provide rectified DC power to the power regulation circuit.

A high frequency noise suppression filter 104 is connected between the common terminal T1 and the functional switch 42. Thus, functional switch 42 controls the ON/OFF functionality of the device 100. Filter 104 is implemented using an RLC filter circuit comprising inductor L1, resistor (R6, R7) and capacitor C2. As those skilled in the art will appreciate the values of the components are selected to provide minimal impedance within a low frequency pass band that includes 60

Hz, and relatively high impedance for frequency components within the "stop band." Stated differently, the RLC filter suppresses high frequency noise generated by the triac Q1 such that it is not being propagated out into the AC distribution system 1.

The circuit 100 also includes a voltage regulator circuit 106 that is comprised of resistor R5 and diac Q3. Those skilled in the art will appreciate that the 120 VAC provided by the distribution system may fluctuate somewhat depending on a variety of factors. As the magnitude of the AC voltage varies between, e.g., 120 VAC and 115 VAC, the timing of the AC cycle can also vary (e.g., the zero-crossing point from the positive half-cycle to the negative half-cycle). Thus, diac Q3 is selected to clamp the AC voltage at a predetermined level (e.g., +/−60 V) such that the timing remains constant.

The circuit further includes a load regulation portion 108 that includes a power-up regulation portion 108-1 and a resistive regulation portion 108-2. The power-up regulation portion 108-1 includes a positive half cycle filter 108-10 and a negative half cycle filter 108-12 that include identical RC networks. As those skilled in the art will appreciate, diode D2 allows capacitor C3 to charge during the positive half cycle, whereas diode D3 allows capacitor C4 to charge during the negative half cycle. The function of the power-up regulation portion 108-1 is to provide the fluorescent lighting load L with the relatively high energy they require when power is initially applied. For the first few AC cycles, the start-up portion 108-1 bypasses the steady-state resistor network 108-2 such that capacitor C1 is charged more quickly to a predetermined voltage based on the values of R5, C3 (or C4), and C1. Once the capacitors C3, C4 are charged up, the impedance of the power-up regulation portion 108-1 is relatively high and no longer bypasses the steady state resistor network 108-2.

The resistive regulation portion 108-2 comprises the resistive network (R13, R1, RCAL, and R3/R4) which is configured to charge capacitor C1. The resistive regulation portion 108-2 regulates the amount of time that triac Q1 is turned ON within the AC cycle. The functional dimmer actuator 52 is connected to potentiometer 56 (R1) and is the main control used by the consumer to control the brightness of the load. The resistive regulation portion 108-2 in combination with capacitor C1 is characterized by a time constant (τ) that corresponds to a delay between the zero-crossing of the AC signal and the firing angle of the circuit. Thus, regulation circuit 108-2 is configured to turn diac Q2 ON at a predetermined point during the AC cycle. When the voltage on capacitor C1 attains the break over voltage of diac Q2, C1 provides a current that is high enough to turn triac Q1 ON. Thus, the timing circuit 108-2 turns Q1 ON and OFF a predetermined number of times during each AC cycle as determined by the user-selectable setting of potentiometer 56. RCAL is a calibration resistor that is provided in the factory. R3 is a trim adjustment resistor that is used to calibrate the circuit 100 to a particular fan motor or lighting load. Stated differently, R3 can be used by the consumer to adjust the minimum light intensity provided by the dimmer. In an embodiment of the invention, R3 is accessible to the user. In another embodiment, R3 is accessible to the user when the wall plate is removed.

Figure 33:
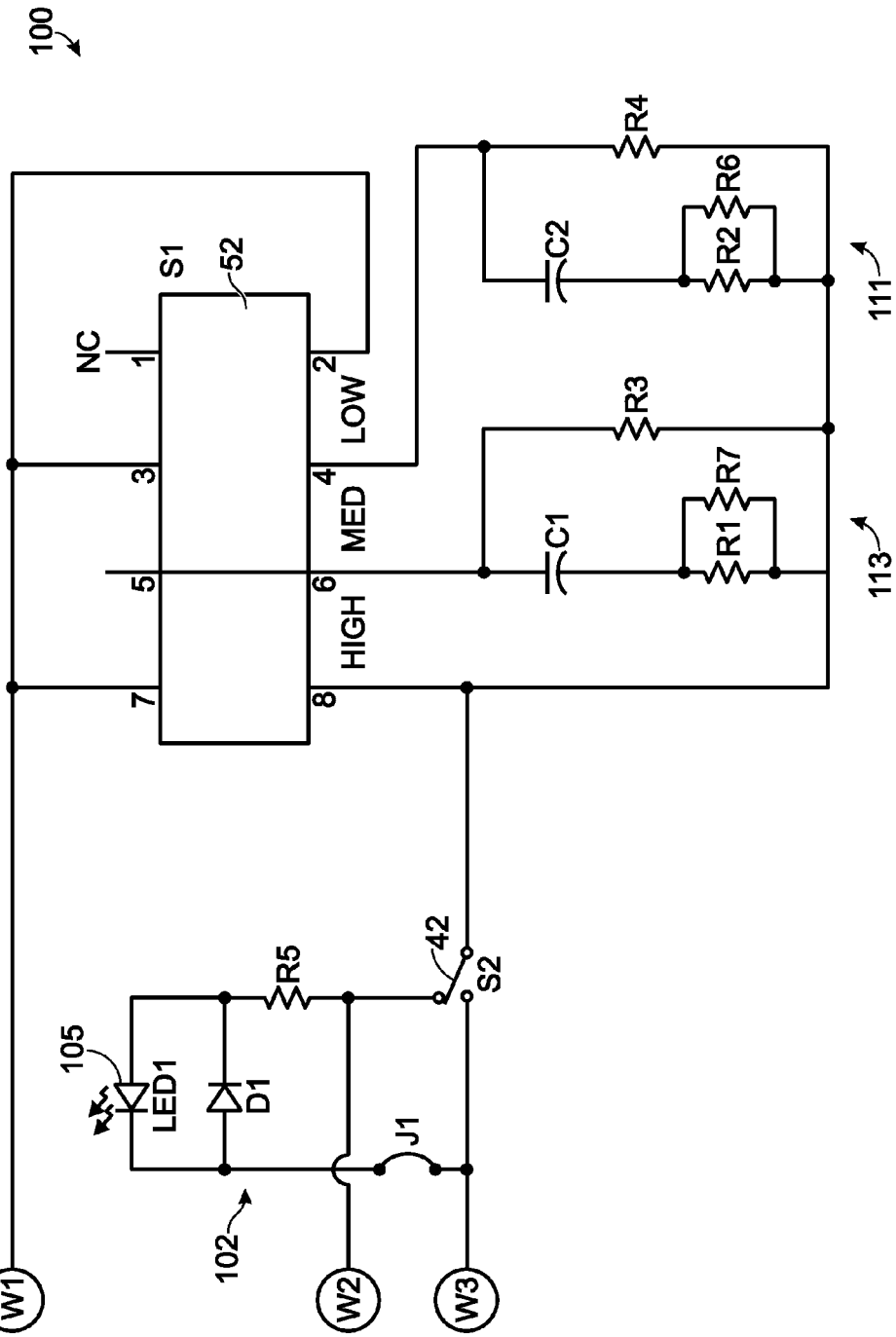
FIG. 33 is a schematic view of a power control device in accordance with another alternate embodiment of the present invention.

As embodied herein and depicted in FIG. 33, a schematic view of a power control device 100 in accordance with another alternate embodiment of the present invention is disclosed. This embodiment is directed to a fan controller having an ON/OFF control switch 42 in conjunction with multiple discrete speed settings adjusted by functional dimmer control 52. Terminal W1 is configured to be connected to the common conductor 154 shown in FIG. 31. Terminals W2 and W3 are configured to be connected to the traveler conductors 152. Diode D1 is connected between the traveler terminals (T2, T3) and provides LED1 with rectified power when the functional switch 42 is in the OFF position as shown. Again, LED1 functions as a locator when the device 10 (100) is in a darkened space/room.

As before, the functional switch 42 provides the ON/OFF functionality and the functional dimmer 52 may be set at three discrete power settings (LOW, MEDIUM, or HIGH). When the dimmer switch is in the LOW position, contact pins 1, 2, 3 and 4 are connected such that a first stepped impedance 111 (including C2, resistors R2, R4 and R6) provides a relatively high impedance. In one embodiment the stepped impedance 111 is about 560 Ohms. In the MEDIUM switch setting, contacts 3, 4, 5, and 6 are closed such that a second stepped impedance 113 is placed in parallel with the first stepped impedance 111. The second stepped impedance includes capacitor C1 and several resistors (R1, R7, and R3). If both of the stepped impedances are implemented using the same values, their parallel impedance will be half that of their individual impedances such that the fan speed (or light intensity) is doubled vis á vis the LOW setting. IN the HIGH setting, contacts 7, 8 are shorted together such that impedance provided by circuit 100 is essentially zero.

Figure 34:
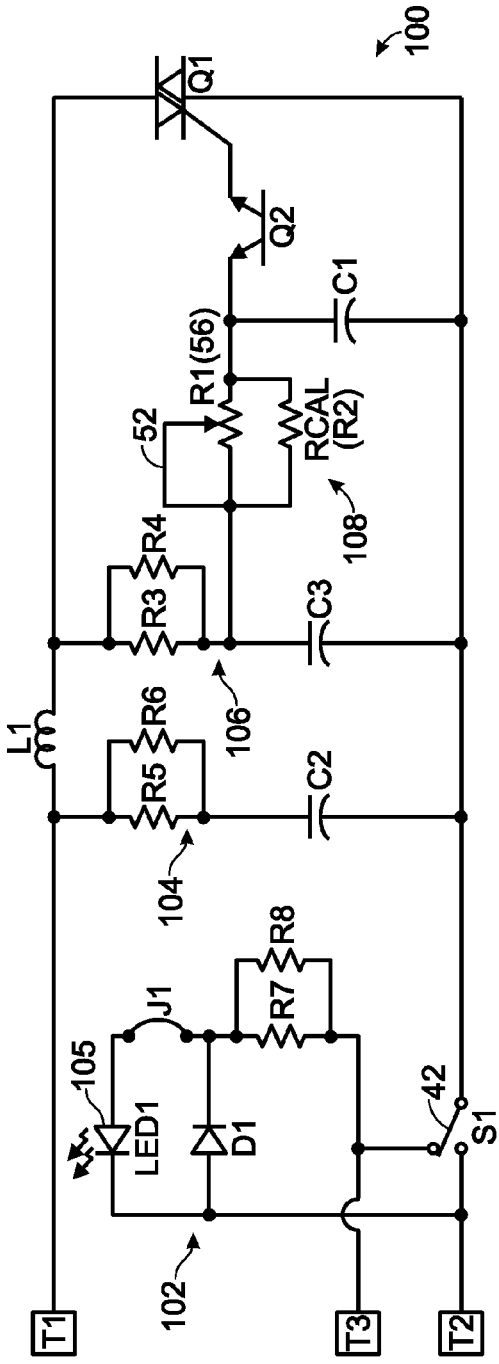
FIG. 34 is a schematic view of a power control device in accordance with another alternate embodiment of the present invention.

As embodied herein and depicted in FIG. 34, a schematic view of a power control device in accordance with another alternate embodiment of the present invention is disclosed. In this embodiment, the circuit 100 is configured to regulate the power provided to a relatively low power incandescent lighting fixture. In one embodiment, circuit 100 is configured to control a 700 W incandescent load. The terminals T1-T3 are the same as those previously described as is the locator light LED1. Like previous embodiments, circuit 100 includes a high frequency noise suppression filter 104. Thus, the description of these elements is omitted for brevity's sake.

The voltage regulator circuit 106 is simplified in this embodiment and includes capacitor C3 instead of a diac Q3. Essentially, capacitor C3 and resistors R3/R4 function as a filter when C3 is fully charged. The filter provides a voltage signal that is clamped by C3 and is characterized by the filter frequency.

Because circuit 100 is configured to control a purely resistive incandescent light, the power regulation circuit 108 is much simpler than that provided in FIG. 32. Circuit 108 includes RCAL which is provided at the factory and potentiometer 56 which is adjusted by the user via functional dimmer switch 52. As before, potentiometer is 56 is adjusted to change the time constant of the RC circuit, and hence, the time that triac Q1 is turned ON during a given AC cycle.

Figure 35:
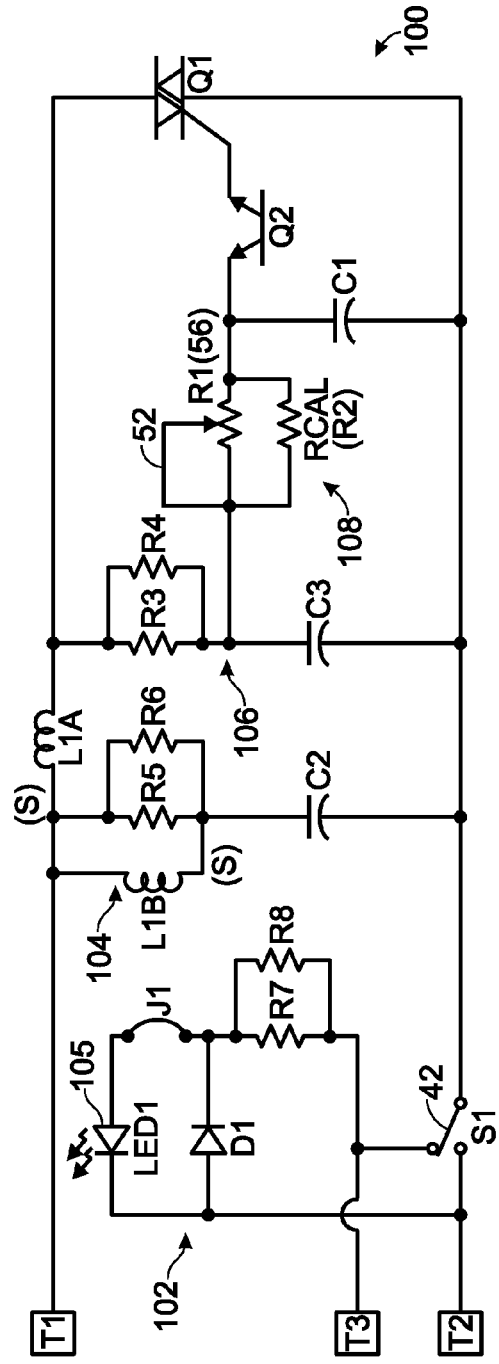
FIG. 35 is a schematic view of a power control device in accordance with another alternate embodiment of the present invention.

As embodied herein and depicted in FIG. 35, a schematic view of a power control device in accordance with another alternate embodiment of the present invention is disclosed. In this embodiment, the circuit 100 is configured to regulate the power provided to a relatively high power incandescent lighting fixture. In one embodiment, circuit 100 is configured to control an 1100 W incandescent load. With the exception of the high frequency noise suppression filter 104 and power handling rating of certain components, the high power incandescent circuit 100 is identical to the low power circuit depicted in FIG. 34. With respect to the high frequency noise suppression circuit 104, a transformer comprising inductors L1A and L1B is provided in place of the single inductor L1 employed in FIG. 34. The transformer provides the same performance within the RLC filter but with improved power handling capabilities. Because of the transformer action provided by inductor L1B, inductor L1A can be implemented with a fewer number of turns. The reduced number of turns means that the DC resistance of the inductor L1A is less than the resistance of inductor L1 (FIG. 34). Accordingly, the power dissipation performance ($I^2R$) is improved. This is important when one considers that Power equals voltage times current. In both systems, the voltage (e.g. 120 VAC) is the same. Thus, an 1100 W load must draw far more current than a 700 W load. Thus, the transformer L1A/L1B is configured to reduce the power dissipated in the 1100 W circuit to a level that is comparable to the 700 W circuit.

Figure 36:
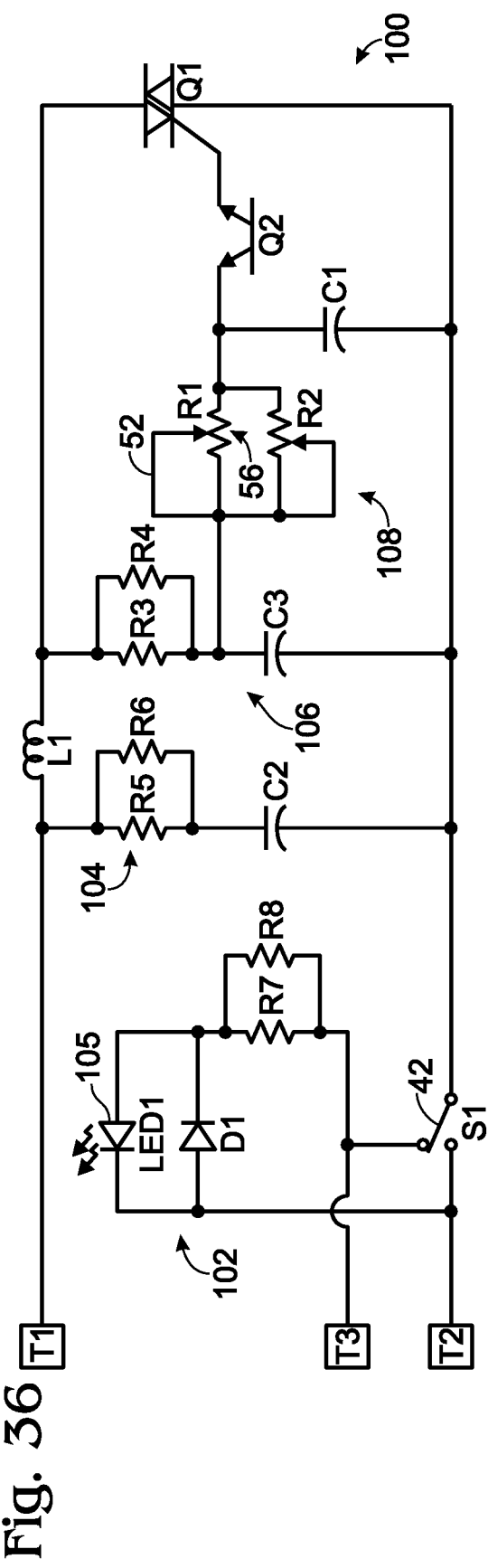
FIG. 36 is a schematic view of a power control device in accordance with another alternate embodiment of the present invention.

As embodied herein and depicted in FIG. 36, a schematic view of a power control device in accordance with another alternate embodiment of the present invention is disclosed. The structure of the circuit in this embodiment appears to be essentially the same as the one depicted in FIG. 34, and while it is, there are important differences. For example, this embodiment is directed to magnetic low voltage (MLV) loads, whereas the embodiment of FIG. 34 is directed to incandescent lighting. As those skilled in the art will appreciate, an MLV load employs a transformer that transforms the 120 VAC on the primary to 12 VAC on the secondary. MLV lighting, such as MR16 track lighting fixtures, employ smaller incandescent lamps that require lower voltages. Thus, in the embodiment of FIG. 36, the high frequency noise suppression filter 104 is implemented using higher resistance values for R5/R6 such that the impedance of the RLC circuit 104 matches the MLV transformer. For example, in the embodiment of FIG. 34, R5 may have a value on the order of 10 Ohms, whereas its value in the embodiment of FIG. 36 is on the order of 1 KΩ.

The embodiment of FIG. 36 may be employed with relatively low power loads (e.g., 700 W) and relatively high power (e.g., 1100 W) loads. Unlike the incandescent lighting embodiments of FIGS. 34 and 35, the same RLC circuit 104 may be employed in both MLV embodiments. The only major difference between the two MLV embodiments is that power handling rating of certain components (e.g., Q1, Q2) may be increased to handle the higher power.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A power control device for use in an electrical distribution system that includes at least one electrical load, the device comprising:
    a housing assembly including a plurality of terminals configured to couple the device to the electrical distribution system and a circuit assembly coupled to the plurality of terminals, the circuit assembly including a set of electrical contacts movable between a first position and a second position, the circuit assembly further comprising a power regulation circuit coupled to the set of electrical contacts, the power regulation circuit being configured to control an amount of power provided to the at least one electrical load;
    a heat sink coupled to the housing assembly, the heat sink being configured to dissipate thermal energy generated by the circuit assembly, the heat sink further comprising a major surface including a plurality of frame connection apertures;
    a rocker switch mechanism including a switch actuator member configured to actuate the set of electrical contacts between the first position and the second position, the switch actuator member having a first axis of rotation in or below the major surface;
    a dimmer actuator configured to adjust the power regulation circuit; and
    an interchangeable user interface assembly including a frame member having a plurality of connector elements configured to mate with the plurality of frame connection apertures to thereby connect the frame member to the heat sink, the frame member being removable from the heat sink without any tools, the interchangeable user interface assembly including an interface paddle rotatably coupled to the frame member and detached relative to the rocker switch mechanism such that the interface paddle slidably moves relative to the rocker switch mechanism with at least one degree of freedom during a rotational movement, the user interface assembly further including an interface dimmer movably disposed within the frame member and coupled to the dimmer actuator.

2. The device of claim 1, wherein the plurality of connector elements includes at least one anchor element formed in an end wall portion of the frame member and at least one in-board flexible connector element formed within at least one lateral wall of the frame member.

3. The device of claim 2, wherein the interchangeable user interface assembly is connected to the heat sink by first inserting the at least one anchor element into a corresponding at least one frame connection aperture, rotating the frame member toward the heat sink, coupling the interface dimmer to the dimmer actuator, and inserting the at least one in-board flexible connector element into a corresponding at least one frame connection aperture.

4. The device of claim 3, wherein the dimmer actuator includes a registration feature configured to mate with a portion of the interface dimmer.

5. The device of claim 4, wherein the interface dimmer includes a self-alignment mechanism that includes at least one flexible member having an engagement portion, the at least one flexible member being configured to slidably direct the dimmer registration feature into the engagement portion, the interface dimmer being configured to actuate the dimmer actuator once the registration feature is captured by the engagement portion.

6. The device of claim 2, wherein the at least one anchor element and the at least one in-board flexible connector element are substantially hidden from view when the frame member is connected to the heat sink, the heat sink further including at least one indicia identifying the at least one in-board flexible connector element location when the frame member is connected to the heat sink.

7. The device of claim 2, wherein the interchangeable user interface assembly is removed from the heat sink by manually detaching the at least one in-board flexible connector element from the at least one lateral frame connection aperture, detaching the interface dimmer from the dimmer registration feature, rotating the frame member away from the heat sink, and withdrawing the at least one anchor element from the corresponding at least one frame connection aperture.

8. The device of claim 1, wherein the frame member has a shape and size that are configured to fit within a standard opening having dimensions substantially equal to 1.3 inches by 2.6 inches.

9. The device of claim 1, wherein the rocker switch mechanism includes at least one integral leaf spring member fixed at a center rocker switch portion and cantilevered at an end thereof, the at least one integral leaf spring member including a spring support element disposed at the cantilevered end, an interior portion of the interface paddle being supported by the spring support element.

10. The device of claim 1, wherein the dimmer actuator is a slide dimmer actuator.

11. The device of claim 10, wherein the slide dimmer actuator is slidably actuatable within a lateral slot formed within the major surface of the heat sink, the lateral slot being substantially parallel to a lateral side of the heat sink.

12. The device of claim 10, wherein the slide dimmer actuator is slidably actuatable within a longitudinal slot formed within the major surface of the heat sink, the longitudinal slot being substantially parallel to a longitudinal side of the heat sink.

13. The device of claim 1, wherein the major surface of the heat sink includes a dimmer aperture formed therein, the dimmer actuator is connected to a slide potentiometer via a control lever extending through the dimmer aperture, the slide potentiometer being integrally connected to the power regulation circuit and configured to adjust the amount of power provided to the at least one electrical load.

14. The device of claim 13, wherein the slide potentiometer includes a plurality of discrete switch settings.

15. The device of claim 1, wherein the major surface of the heat sink includes a switch aperture formed therein, the switch actuator member extending through the switch aperture between the rocker switch mechanism and the at least one set of switch contacts.

16. The device of claim 1, wherein the interface paddle rotates around a second axis of rotation offset from the first axis of rotation.

17. The device of claim 16, wherein a width of the interchangeable user interface assembly is a function of an offset between the first axis of rotation and the second axis of rotation.

18. The device of claim 16, wherein the first axis of rotation and the second axis of rotation are on opposite sides of the major surface.

19. The device of claim 16, wherein the interface paddle and the rocker switch mechanism rotate in the same direction during user actuation.

20. The device of claim 1, wherein the dimmer actuator includes a dimmer registration feature, the interface dimmer being coupled to the dimmer actuator via the dimmer registration feature.

21. The device of claim 1, wherein the frame member includes a first pair of trunions configured to rotatably couple the interface paddle to the frame member, and wherein the switch actuator member includes a second pair of trunions configured to rotatably couple the rocker switch mechanism to a portion of the housing assembly, the first pair of trunions being offset from the second pair of trunions in a direction normal to the major surface.

22. The device of claim 1, wherein the circuit assembly includes at least one light emitting element coupled to an aperture in the frame member via a light pipe.

23. The device of claim 1, wherein the at least one set of contacts and the rocker switch mechanism are configured as a single pole double throw switch.

24. The device of claim 1, wherein the circuit assembly is configured to control a fluorescent lighting fixture.

25. The device of claim 24, wherein the power regulation circuit includes a power-up regulation portion in parallel with a resistive regulation portion.

26. The device of claim 25, wherein the power up portion is comprised of at least one diode in series with an RC circuit.

27. The device of claim 25, wherein the power up portion is comprised of at least one temperature coefficient resistor.

28. The device of claim 1, wherein the circuit assembly includes a high frequency noise suppression circuit.

29. The device of claim 28, wherein the high frequency noise suppression circuit includes a transformer having a primary winding and a secondary winding.

30. The device of claim 28, wherein the high frequency noise suppression circuit is configured to impedance match a transformer in a magnetic low voltage lighting fixture.

31. The device of claim 1, wherein the power regulation circuit is configured to turn a semiconductor switch assembly ON during a portion of an AC line cycle determined by a position of the dimmer actuator.

32. The device of claim 31, wherein the semiconductor switch assembly includes a diac, triac or a capacitor.

33. A power control device for use in an electrical distribution system that includes at least one electrical load, the device comprising:

a housing assembly including a plurality of terminals configured to couple the device to the electrical distribution system and a circuit assembly coupled to the plurality of terminals, the circuit assembly including a set of electrical contacts movable between a first position and a second position, the circuit assembly further comprising a power regulation circuit coupled to the set of electrical contacts, the power regulation circuit being configured to control an amount of power provided to the at least one electrical load;

a heat sink coupled to the housing assembly, the heat sink having a major surface configured to dissipate thermal energy generated by the circuit assembly, the major surface including a plurality of frame connection apertures;

a rocker switch mechanism including a switch actuator member configured to actuate the set of electrical contacts between the first position and the second position, the switch actuator member having a first axis of rotation within the housing assembly and under the heat sink;

a dimmer actuator configured to adjust the power regulation circuit, the dimmer actuator including a dimmer registration feature; and an interchangeable user interface assembly including a frame member having a plurality of connector elements configured to mate with the plurality of frame connection apertures, the frame member being removable from the heat sink without any tools, the interchangeable user interface assembly including an interface paddle rotatably coupled to the frame member with a second axis of rotation offset from the first axis of rotation such that the interface paddle is disposed over the rocker switch mechanism but detached therefrom, the interface paddle being slidably movable relative to the rocker switch mechanism during rocker switch actuation, the user interface assembly further including an interface dimmer movably disposed within the frame member and coupled to the dimmer actuator via the dimmer registration feature.

34. The device of claim 33, wherein the plurality of connector elements includes at least one anchor element formed in an end wall portion of the frame member and at least one in-board flexible connector element formed within at least one lateral wall of the frame member.

35. The device of claim 34, wherein the interchangeable user interface assembly is connected to the heat sink by first inserting the at least one anchor element into a corresponding at least one frame connection aperture, rotating the frame member toward the heat sink, coupling the interface dimmer to the dimmer actuator, and inserting the at least one in-board flexible connector element into a corresponding at least one frame connection aperture.

36. The device of claim 35, wherein the at least one anchor element and the at least one in-board flexible connector element are substantially hidden from view when the frame member is connected to the heat sink, the heat sink further including at least one indicia identifying the at least one in-board flexible connector element location when the frame member is connected to the heat sink.

37. The device of claim 34, wherein the interchangeable user interface assembly is removed from the heat sink by manually detaching the at least one in-board flexible connector element from the at least one lateral frame connection aperture, detaching the interface dimmer from the dimmer registration feature, rotating the frame member away from the heat sink, and withdrawing the at least one anchor element from the corresponding at least one frame connection aperture.

38. The device of claim 33, wherein the dimmer actuator includes a registration feature configured to mate with a portion of the interface dimmer.

39. The device of claim 38, wherein the interface dimmer includes a self-alignment mechanism that includes at least one flexible member having an engagement portion, the at least one flexible member being configured to slidably direct the dimmer registration feature into the engagement portion, the interface dimmer being configured to actuate the dimmer actuator once the registration feature is captured by the engagement portion.

40. The device of claim 33, wherein the frame member has a shape and size that are configured to fit within a standard opening having dimensions substantially equal to 1.3 inches by 2.6 inches.

* * * * *